(12) United States Patent
Kobayashi et al.

(10) Patent No.: US 8,000,316 B2
(45) Date of Patent: *Aug. 16, 2011

(54) IP TELEPHONE APPARATUS, ENUM SERVER, TERMINAL APPARATUS AND IP TELEPHONE SYSTEM

(75) Inventors: Kazuto Kobayashi, Kawasaki (JP); Akira Miyajima, Yokohama (JP)

(73) Assignee: PANASONIC Corporation, Osaka (JP)

( * ) Notice: Subject to any disclaimer, the term of this patent is extended or adjusted under 35 U.S.C. 154(b) by 1149 days.

This patent is subject to a terminal disclaimer.

(21) Appl. No.: 11/249,715

(22) Filed: Oct. 14, 2005

(65) Prior Publication Data

US 2006/0092922 A1     May 4, 2006

(30) Foreign Application Priority Data

Nov. 2, 2004    (JP) ................................ 2004-319898

(51) Int. Cl.
*H04L 12/66*     (2006.01)
(52) U.S. Cl. ........ 370/352; 370/353; 370/354; 370/355; 370/356; 370/465; 709/201; 709/202; 709/203; 709/204
(58) Field of Classification Search ............. 370/395.54, 370/352, 351, 353, 354, 355, 356, 357, 465; 709/201, 202, 203, 204
See application file for complete search history.

(56) References Cited

U.S. PATENT DOCUMENTS

| | | | | |
|---|---|---|---|---|
| 6,157,636 | A * | 12/2000 | Voit et al. ....................... | 370/353 |
| 6,292,478 | B1 * | 9/2001 | Farris ............................ | 370/352 |
| 6,324,264 | B1 * | 11/2001 | Wiener et al. ................. | 379/88.22 |
| 6,347,085 | B2 * | 2/2002 | Kelly ............................. | 370/352 |
| 6,349,324 | B1 | 2/2002 | Tokoro | |
| 6,359,880 | B1 * | 3/2002 | Curry et al. .................... | 370/352 |
| 6,373,817 | B1 * | 4/2002 | Kung et al. .................... | 370/217 |
| 6,498,797 | B1 | 12/2002 | Anerousis et al. | |
| 6,567,122 | B1 | 5/2003 | Anderson et al. | |
| 6,917,612 | B2 * | 7/2005 | Foti et al. ...................... | 370/352 |
| 7,243,151 | B2 | 7/2007 | Sekiguchi | |

(Continued)

FOREIGN PATENT DOCUMENTS

EP     1061728     12/1999

(Continued)

OTHER PUBLICATIONS

Network Working Group M. Mealling R. Daniel Request for Comments: 2915 Updates: 2168 Sep. 2000.*

(Continued)

*Primary Examiner* — Joe Cheng
*Assistant Examiner* — Wutchung Chu
(74) *Attorney, Agent, or Firm* — Greenblum & Bernstein, P.L.C.

(57) ABSTRACT

An IP telephone apparatus is connected to an ENUM server and a Web server via an IP network. The ENUM server has a database that stores an IP telephone URI as terminal information of the IP telephone apparatus and a Web server URI corresponding to the IP telephone apparatus. The Web server stores image data captured by a camera. The IP telephone apparatus transmits to the ENUM server a query on terminal information of a destination IP telephone apparatus; receives from the ENUM server the terminal information of the destination IP telephone apparatus; acquires from the received terminal information a Web server URI corresponding to the destination IP telephone apparatus and performs visual communication with the Web server based on the Web server URI; and displays captured image data received from the Web server in the visual communication.

12 Claims, 19 Drawing Sheets

U.S. PATENT DOCUMENTS

| | | | |
|---|---|---|---|
| 7,350,224 B2 * | 3/2008 | Creamer et al. | 725/105 |
| 7,453,827 B2 * | 11/2008 | Toyoda | 370/260 |
| 2001/0055299 A1 * | 12/2001 | Kelly | 370/352 |
| 2002/0099830 A1 | 7/2002 | Viechter | |
| 2002/0156899 A1 | 10/2002 | Sekiguchi | |
| 2002/0165969 A1 * | 11/2002 | Gallant | 709/227 |
| 2002/0196746 A1 | 12/2002 | Allen | |
| 2003/0058805 A1 * | 3/2003 | Meyerson et al. | 370/260 |
| 2003/0058806 A1 * | 3/2003 | Meyerson et al. | 370/260 |
| 2003/0058844 A1 * | 3/2003 | Sojka et al. | 370/352 |
| 2003/0059002 A1 * | 3/2003 | Meyerson et al. | 379/88.13 |
| 2003/0193486 A1 * | 10/2003 | Estrop | 345/204 |
| 2003/0212758 A1 * | 11/2003 | Anderson et al. | 709/217 |
| 2003/0214940 A1 | 11/2003 | Takken | |
| 2004/0057421 A1 * | 3/2004 | Kawabata et al. | 370/352 |
| 2004/0068574 A1 * | 4/2004 | Costa Requena et al. | 709/230 |
| 2005/0057644 A1 * | 3/2005 | Huang | 348/14.01 |
| 2005/0182781 A1 | 8/2005 | Bouvet | |
| 2008/0291263 A1 | 11/2008 | Tokoro | |
| 2009/0252302 A1 * | 10/2009 | Monroe | 379/37 |

FOREIGN PATENT DOCUMENTS

| | | |
|---|---|---|
| JP | 8-130594 | 5/1996 |
| JP | 11-234642 | 8/1999 |
| JP | 2002-319956 | 10/2002 |
| JP | 2003-209634 | 7/2003 |
| JP | 2004-248069 | 9/2004 |
| JP | 2004-248086 | 9/2004 |
| JP | 2005-323172 | 11/2005 |
| WO | 03/107627 | 12/2003 |
| WO | 2004/019592 | 3/2004 |

OTHER PUBLICATIONS

Falstrom et al., "The E.164 to Uniform Resource Identifier (URI) Dynamic Delegation Discovery System (DDDS) Application (ENUM)," IETF Standard, Internet Engineering Task Force, IETF, CH, (Apr. 2004), XP015009541.

Falstrom, "E. 164 number and DNS," IETF Standard, Internet Engineering Task Force, IETF, CH, (Sep. 2000), XP015008699.

Conroy et al. JPRSL, "ENUM Implementation Issues and Experiences," IETF Standard-Working-Draft, Internet Engineering Task Force, IETF, CH, vol. enum, (Jul. 2004), XP015018179.

Stastny, "Scenarios for ENUM and ENUM-like Systems <draft-stantny-enum-scenarios-00.txt>," IETF Standard-working-draft, Internet Engineering Task Force, IETF, CH, pp. 1-18, (Jun. 2002), XP015005364.

"Report of the Department of State ITAC-T Advisory Committee Study Group A Ad Hoc on ENUM," chaired by G. Richenaker, ENUM, pp. 1-39, (Jun. 6, 2001), XP002238095.

Kaspch Carriercom AG: "ENUM Trial," online (Dec. 28, 2003), XP002363054, Retrieved from the Internet <URL: http://web.archive.org/web/20031228201931/http://www.kapsch.net/CarrierCom/de/4627_DEU_HTMLExtranetCD.html > on Jan. 10, 2005, in English and German.

English Language Abstract of JP 2004-248086.

English Language Abstract of JP 8-130594.

ENUM Trial Japan, "ENUM Trial Japan First Report," May 2004, together with an English language translation of the same.

Sinnreich et al., "Mastering TCP/IP SIP, Chapter 14 (DVS and ENUM)" together with an English language translation of the same.

U.S. Appl. No. 11/150,119 to Kobayashi et al. , which was filed Jun. 13, 2005.

U.S. Appl. No. 11/235,217 to Miyajima et al., which was filed Sep. 27, 2005.

U.S. Appl. No. 11/235,275 to Miyajima, which was filed Sep. 27, 2005.

U.S. Appl. No. 11/235,156 to Miyajima et al., which was filed Sep. 27, 2005.

U.S. Appl. No. 11/235,273 to Miyajima et al., which was filed Sep. 27, 2005.

U.S. Appl. No. 11/235,154 to Miyajima, which was filed Sep. 27, 2005.

English Language Abstract of JP 2004-248086, publication date unknown.

English Language Abstract of JP 8-130594, publication date unknown.

Sinnreigh et al., "Mastering TCP/IP SIP, Chapter 14 (DVS and ENUM)." Oct. 25, 2002, together with an English language translation of the same.

* cited by examiner

Fig.5

ENUM database

| ENUM domain name | | Order | Preference | Flags | Service | URI scheme |
|---|---|---|---|---|---|---|
| 0.0.0.0.0.0.0.1.3.1.8.e164.arpa | IN NAPTR | 100 | 10 | " u " | " E2U+http " | "!^.*$!http://www.tokyo1.sip.com/user81310000000.html" |
| 1.0.0.0.0.0.0.1.3.1.8.e164.arpa | IN NAPTR | 100 | 10 | " u " | " E2U+http " | "!^.*$!http://www.tokyo2.sip.com/user81310000001.html" |

NAPTR resource records

Fig.9

ENUM database

| ENUM domain name | | Order | Preference | Flags | Service | URI scheme |
|---|---|---|---|---|---|---|
| 0.0.0.0.0.0.0.1.3.1.8.e164.arpa | IN NAPTR | 100 | 10 | "u" | "E2U+sip" | "!^.*$!sip:81310000000tokyo.sip.jp" |
| | IN NAPTR | 100 | 10 | "u" | "E2U+http" | "!^.*$!http://www.tokyo1.sip.com/user81310000000.html" |
| 1.0.0.0.0.0.0.1.3.1.8.e164.arpa | IN NAPTR | 100 | 10 | "u" | "E2U+sip" | "!^.*$!sip:81310000001tokyo.sip.jp" |
| | IN NAPTR | 100 | 10 | "u" | "E2U+http" | "!^.*$!http://www.tokyo2.sip.com/user81310000001.html" |

NAPTR resource records

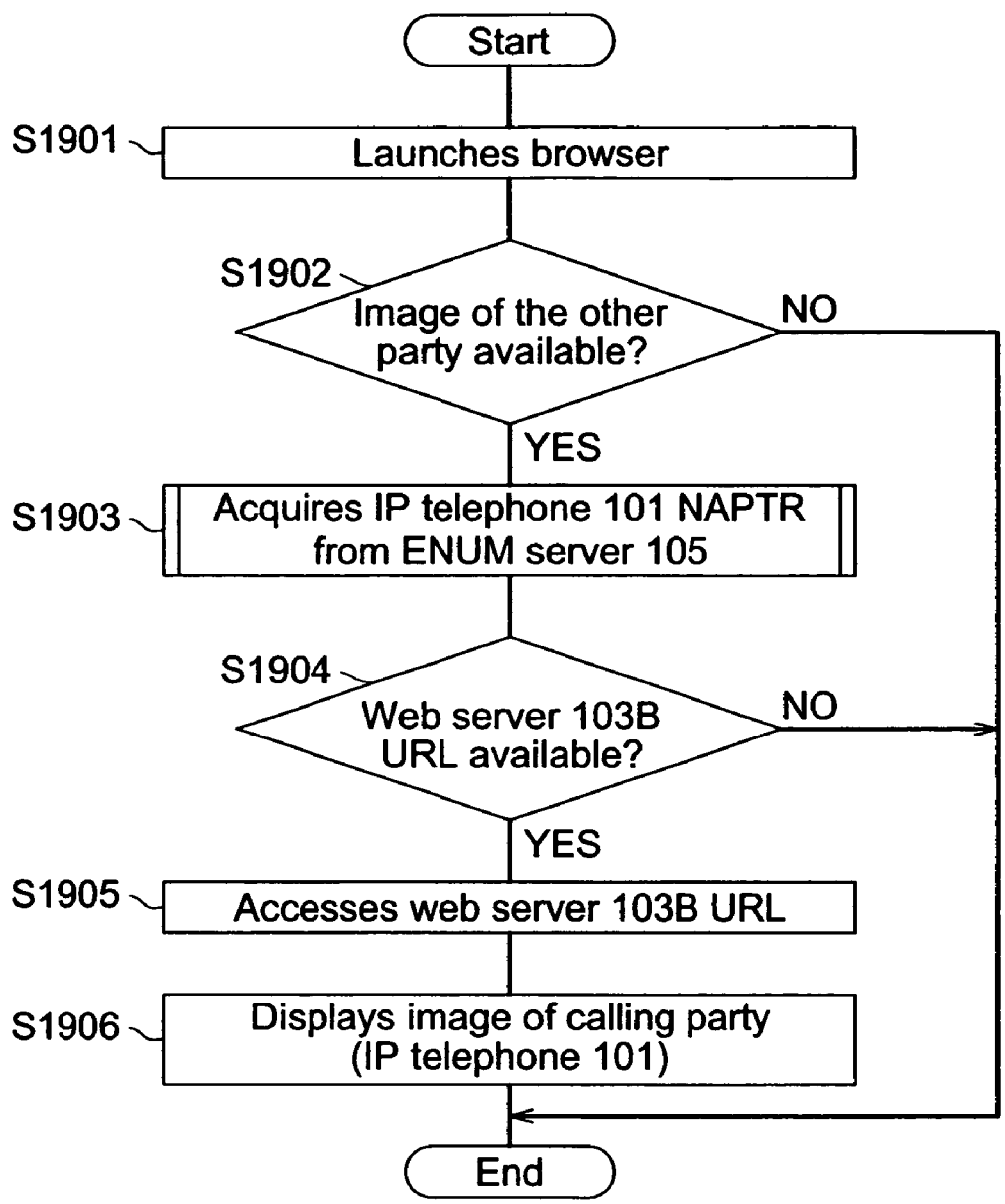

US 8,000,316 B2

IP TELEPHONE APPARATUS, ENUM SERVER, TERMINAL APPARATUS AND IP TELEPHONE SYSTEM

BACKGROUND OF THE INVENTION

1. Field of the Invention

The present invention relates to an IP telephone apparatus, an ENUM server, a terminal apparatus and an IP telephone system, particularly to an IP telephone apparatus, an ENUM server, a terminal apparatus and an IP telephone system that provide visual communication.

2. Description of Related Art

With rapid spread of the Internet these days, an IP telephone system draws attention since the system allows low-rate calls to a telephone apparatus in a remote location and free calls between IP telephone apparatuses of subscribers. A protocol "ENUM (Telephone Number Mapping)," provided in RFC2916 (Publication 1) that the IETF (Internet Engineering Task Force) and the ITU-T (International Telecommunication Union-Telecommunication Standardization Sector) have been developing, is used to connect services and resources on the Internet with telephone numbers.

Based on a DNS (Domain Name System) architecture, the "ENUM" protocol retrieves IP addresses or URI's (Uniform Resource Identifier), using telephone numbers converted to meet the E.164 system defined by the ITU-T.

Using a URI set in NAPTR recourse records registered on the ENUM server, an IP terminal apparatus is able to access a variety of resources that the IP terminal apparatus supports. Services taking advantage of the resources include visual communication, proposed by a plurality of companies.

[Publication 1] The first report of ENUM Trial Japan issued by ENUM Trial Japan in May, 2004

However, the visual communication that uses the IP terminal apparatus requires an additional investment in new software and hardware to allow motion image capture and high-speed encoding and decoding. The cost burden on users hampers the growth of visual communication.

It is, therefore, expected to achieve inexpensive visual communication that uses a telephone apparatus, a personal computer and other user-owned properties.

SUMMARY OF THE INVENTION

The present invention is provided to address the above-described problems. The purpose of the present invention is to provide an IP telephone apparatus, an ENUM server, a terminal apparatus and an IP telephone system that enable inexpensive visual communication, utilizing an IP telephone apparatus, a browser-installed personal computer and other user-owned properties.

The present invention relates to an IP telephone apparatus connected to an ENUM server and a Web server via an IP network. The ENUM server has a database that stores an IP telephone URI as terminal information of the IP telephone apparatus and a Web server URI corresponding to the IP telephone apparatus. The Web server stores image data captured by a camera. The IP telephone apparatus includes a transmitter that transmits, to the ENUM server, a query on terminal information of a destination IP telephone apparatus; a receiver that receives, from the ENUM server, the terminal information of the destination IP telephone apparatus; a visual communicator that acquires the received terminal information of the destination IP telephone apparatus and performs visual communication with the Web server, based on a Web server URI corresponding to the terminal information; and a display that displays captured image data received from the Web server in the visual communication.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 5 illustrates an example of NAPTR records according to the first embodiment;

FIG. 9 illustrates an example of NAPTR records according to the second embodiment;

FIG. 19 illustrates a flowchart describing operations of a destination PC in the sequence diagram of FIG. 15.

DETAILED DESCRIPTION OF PREFERRED EMBODIMENTS

The embodiments of the present invention are explained in the following, in reference to the above-described drawings.

First Embodiment

Figure 1:
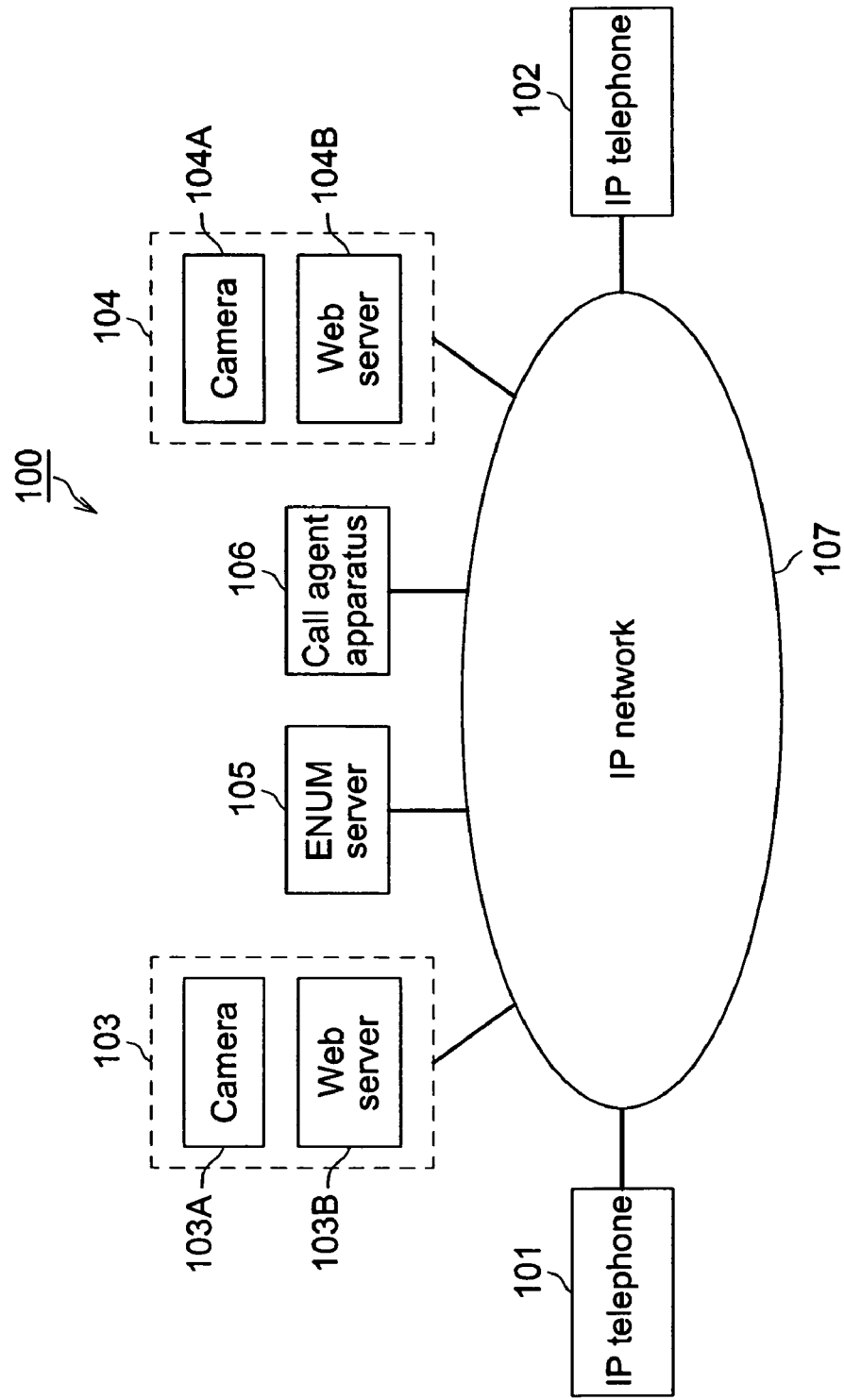
FIG. 1 illustrates an IP telephone system configuration according to a first embodiment of the present invention.

FIG. 1 illustrates an overall configuration of an IP telephone system according to the first embodiment. In IP telephone system 100, a plurality of IP telephone apparatuses (hereinafter referred to as IP telephones) 101 and 102, network cameras 103 and 104, ENUM server 105 and call agent apparatus (hereinafter referred to as CA) 106 interconnect via IP network 107 as shown in FIG. 1. The configuration is not limited as shown; three or more IP telephones can be connected to configure the IP telephone system.

IP telephone 101 (102) has a function to allow a voice call with another IP telephone over IP network 107 and a function to display still image data received from network camera 104 (103).

Network camera 103 (104) has built-in camera 103A (104A) and Web server 103B (104B). Camera 103A (104A) periodically captures still images and outputs the captured still image data to Web server 103B (104B). Web server 103B (104B) creates an HTML file of the still image data input from camera 103A (104A) and transmits the file over IP network 107 to IP telephone 102 (101) that accesses Web server 103B (104B).

ENUM (Telephone Number Mapping) server 105 has a database that stores NAPTR (The Naming Authority Pointer) resource records (hereinafter referred to as NAPTR records). In response to a query from IP telephone 101 (102), ENUM server 105 returns, to IP telephone 101 (102), NAPTR records stored on the database.

CA 106 controls call connection between IP telephones 101 and 102 connected to IP network 107. In response to a call connection request from source IP telephone 101 (102), CA 106 controls call connection with destination IP telephone 102 (101).

Figure 2:
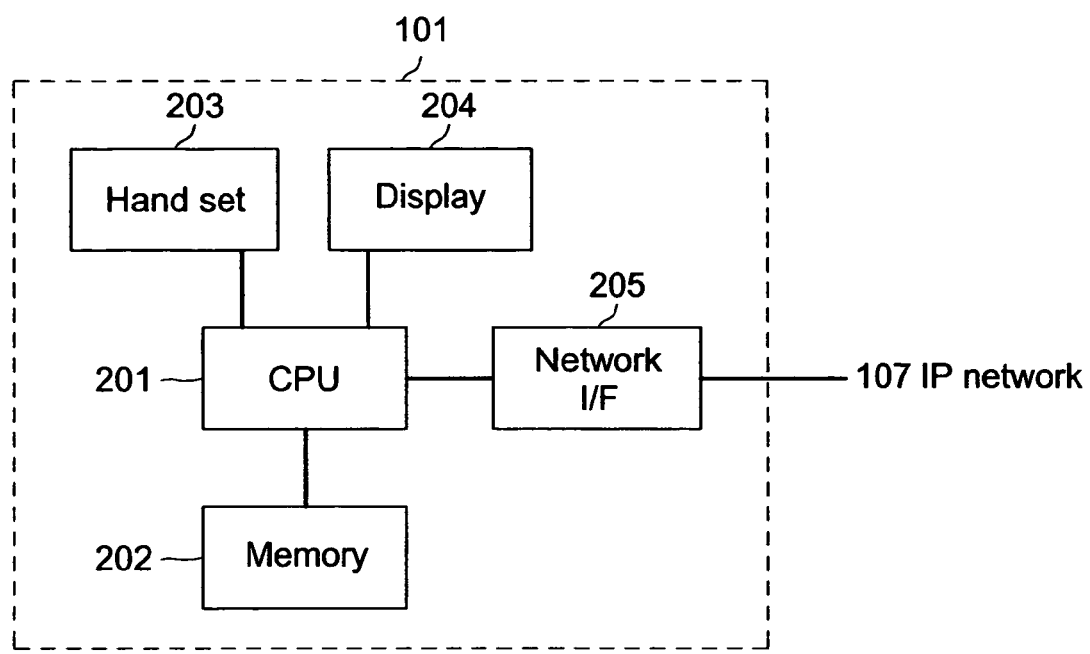
FIG. 2 illustrates a block diagram describing an IP telephone configuration according to the first embodiment.

FIG. 2 is a block diagram illustrating an IP telephone 101 configuration according to the first embodiment. IP telephone 102 has the same configuration as IP telephone 101.

As shown in FIG. 2, IP telephone 101 mainly includes CPU 201, memory 202, handset 203, display 204 and network interface (hereinafter referred to as network I/F) 205.

Based on a voice call control program stored in memory 202, CPU (Central Processing Unit) 201 controls all operations required for a voice call with IP telephone 102 via IP network 107. CPU 201 thus executes call control with a destination terminal, complying with call control protocols, including SIP (Session Initiation Protocol) and H.323. CPU 201 also provides predetermined instructions to display 204 and network I/F 205.

Furthermore, CPU 201 transmits to CA 106 a terminal registration request of IP telephone 101; controls reception of a reply to the registration request (Register) from CA 106; and, based on SIP, controls call start procedures with destination IP telephone 102 via CA 106.

After a call starts with destination IP telephone 102, CPU 201 transmits to ENUM server 105 a NAPTR query of destination IP telephone 102 and controls reception of a reply to the query from ENUM server 105.

CPU 201 furthermore provides a browser function, that is, to control access to a URL of Web server 104B built in destination network camera 104, based on an IP address included in the received NAPTR records; reception of a reply to the access from Web server 104B; and reception of still image data from Web server 104B after receiving the reply. CPU 201 functions as a visual communicator.

Memory 202 functions as ROM (Read Only Memory) that stores a voice call control program and other programs that CPU 201 executes. Memory 202 also functions as RAM (Random Access Memory) used as work memory when CPU 201 executes the programs.

Handset 203 outputs to CPU 201 one of an off-hook signal and an on-hook signal, depending on user's operation, one of off-hook and on-hook. Handset 203 has a microphone and a speaker. When a call starts with a destination terminal, the microphone converts a transmitting voice into a transmitting audio signal and outputs the signal to CPU 201. The speaker, at the same time, outputs a receiving audio signal input from CPU 201 as a receiving voice.

Display 204, configured with a liquid crystal panel and other parts, displays the current status of IP telephone 101 and a telephone number and other information of a source IP telephone input from CPU 201. Display 204 displays, as a browser, still image data input from CPU 201. Display 204 functions as a display.

Network I/F 205 is an interface with IP network 107 to which IP telephone 101 connects. Controlled by CPU 201, Network I/F 205 transmits to CA 106 a registration request (Register); receives from CA 106 a reply to the registration request; and processes call start with destination IP telephone 102 via CA 106 based on SIP.

Controlled by CPU 201, Network I/F 205 furthermore transmits to ENUM server 105 a NAPTR record query of destination IP telephone 102; receives a reply to the query from ENUM server 105; accesses a URL of Web server 104B built in destination network camera 104, based on an http address included in the received NAPTR records; receives a reply to the access from Web server 104B; and, after receiving the reply, receives still image data from Web server 104B. Network I/F 205 functions as a transmitter and a receiver.

Figure 3:
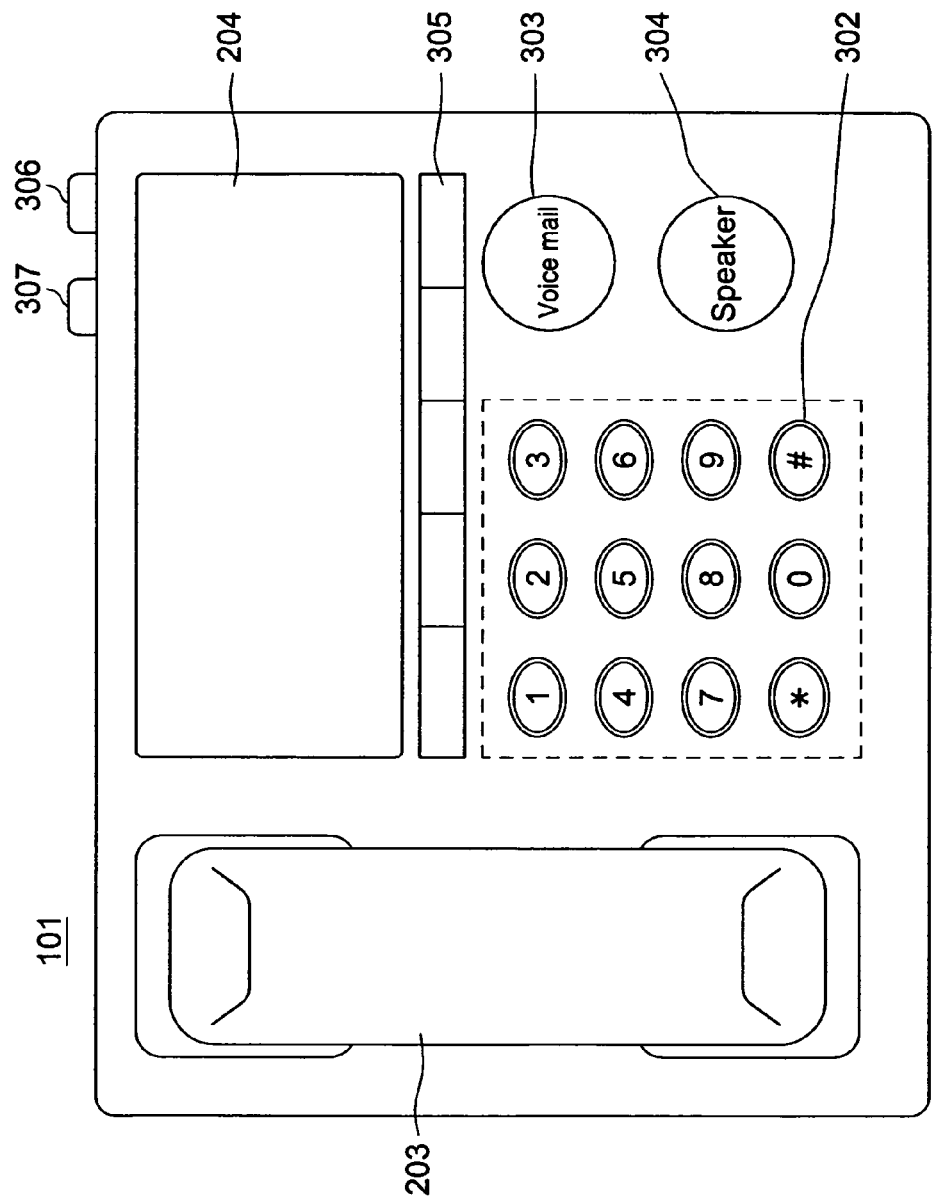
FIG. 3 illustrates a front view of the IP telephone in FIG. 2.

FIG. 3 is a front view of IP telephone 101 according to the first embodiment. IP telephone 102 has the same layout.

As shown in FIG. 3, IP telephone 101 incorporates handset 203 that has a microphone to receive a user's voice and a speaker to output a receiving voice; keypad 302 that allows input of a telephone number and other information; voicemail key 303 that operates a voicemail function; speaker key 304 that switches a voice to external output; and function keys 305 that allow setting of a variety of functions, including one-touch dialing. IP telephone 101 furthermore provides, on its side, a LAN interface (LAN I/F) 306 connecting to IP network 107 and PSTN interface (PSTN I/F) 307 connecting to PSTN.

Figure 4:
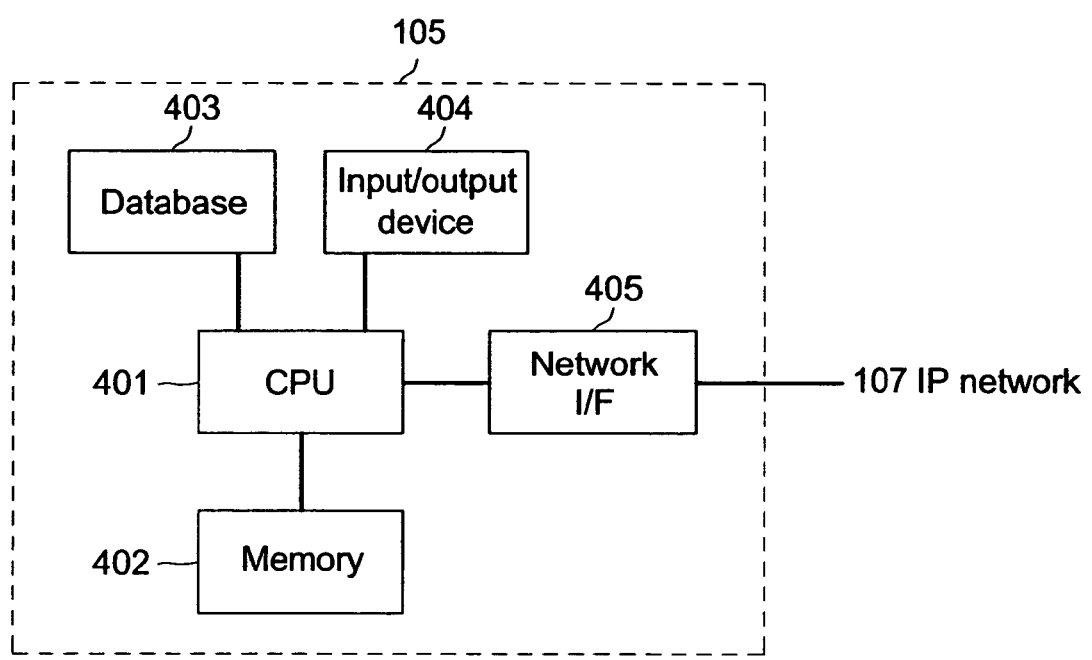
FIG. 4 illustrates a block diagram describing an ENUM server configuration according to the first embodiment.

FIG. 4 is a block diagram illustrating an ENUM server 105 configuration according to the first embodiment. As shown in FIG. 4, ENUM server 105 mainly includes CPU 401, memory 402, database 403, input/output device 404 and network I/F 405.

Based on a control program stored in memory 402, CPU 401 controls the entirety of ENUM server 105. When receiving from IP telephone 101 a NAPTR records query of destination IP telephone 102, for instance, CPU 401 retrieves corresponding NAPTR records from data registered on database 403, which is described later, and returns the NAPTR records to IP telephone 101 that transmitted the query. CPU 401 functions as a retriever.

Memory 402 functions as ROM (Read Only Memory) that stores a control program and other programs that CPU 401 executes. Memory 402 also functions as RAM (Random Access Memory) used as work memory when CPU 401 executes the programs.

Database 403, configured with a hard disk drive and other devices, stores the NAPTR records. FIG. 5 shows an example of NAPTR records stored on database 403 according to the first embodiment. In the example of FIG. 5, the NAPTR records are stored corresponding to domain names obtained from telephone numbers "0310000000" and "0310000001." Database 403 functions as a memory.

In FIG. 5, a URI "!^.*$!http://www.tokyo1.sip.com/user81310000000.html" corresponds to a domain name "0.0.0.0.0.0.0.1.3.1.8.e164.arpa," obtained from the telephone number "0310000000." The service field includes "E2U+http," indicating that http (hyper text transfer protocol) is supported.

A description "http://www.tokyo1.sip.com/user81310000000.html" in the URI represents an http address of Web server 103B.

Similarly, a URI "!^.*$!http://www.tokyo2.sip.com/user81310000001.html" corresponds to a domain name "1.0.0.0.0.0.0.1.3.1.8.e164.arpa," obtained from the telephone number "0310000001." The service field includes "E2U+http," indicating that http is supported.

A description "http://www.tokyo2.sip.com/user81310000001.html" in the URI represents an http address of Web server 104B.

Input/output device 404 is configured with an input device, including a keyboard, used to maintain ENUM server 105 and an output device, including a display, to display maintenance information. Network I/F 405 is an interface with IP network 107 to which ENUM server 105 is connected. Controlled by CPU 201, network I/F 405 receives from IP telephone 101 (102) a NAPTR records (terminal information) query of destination IP telephone 102 (101) and transmits retrieved NAPTR records to IP telephone 101 (102). Network I/F functions as a receiver and a transmitter.

Next, operations in IP telephone system 100 of FIG. 1 are discussed with reference to a sequence diagram in FIG. 6. The operations include a request from IP telephones 101 and 102 to CA 106 for terminal registration; a request from IP telephone 101 to CA 106 for a call to IP telephone 102; and, after the call starts between IP telephones 101 and 102, establishment of visual communication between IP telephones 101 and 102.

Figure 6:
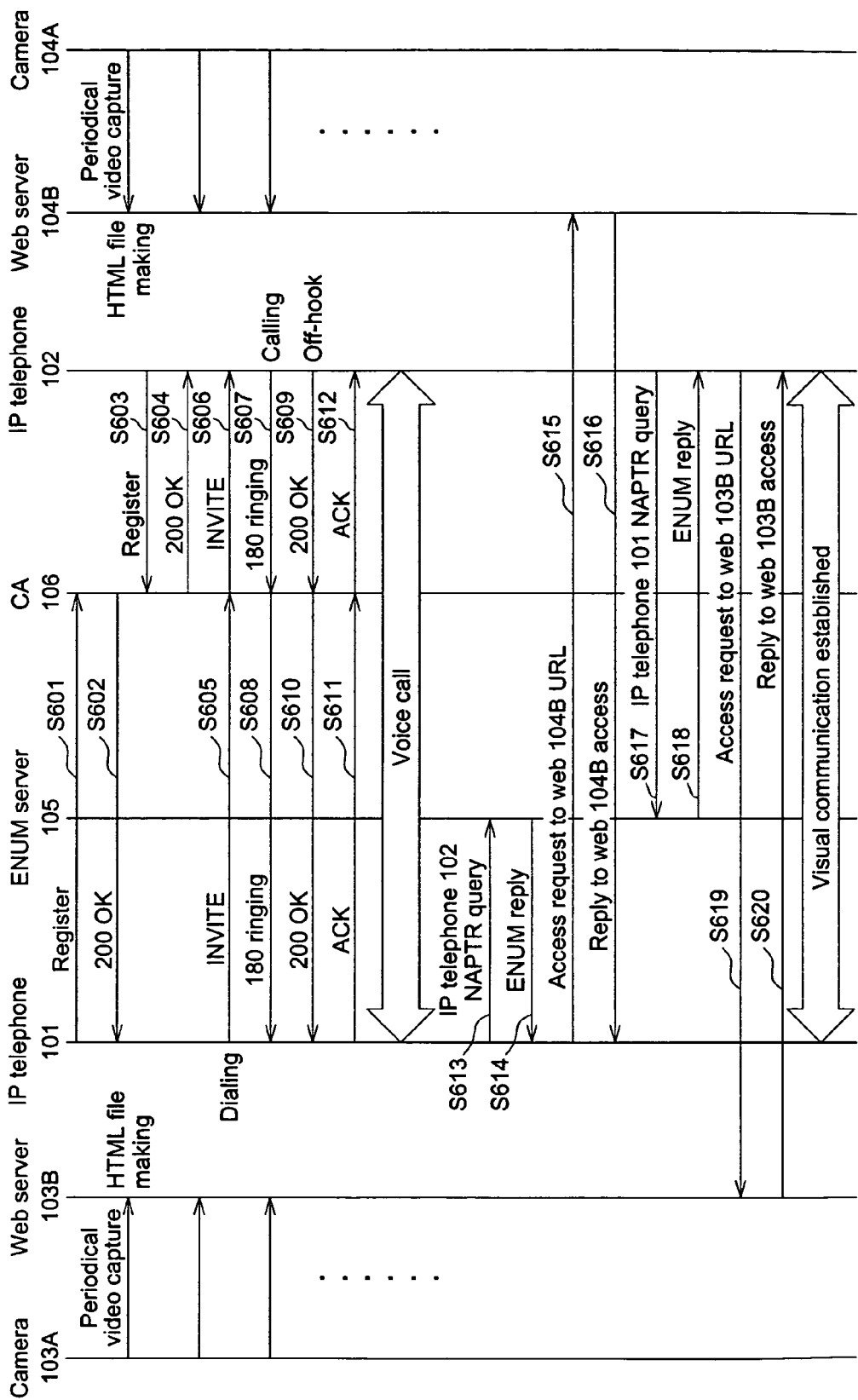
FIG. 6 illustrates a sequence diagram describing operations from call start between IP telephones to establishment of visual communication between the IP telephones in the IP telephone system according to the first embodiment.

As a premise to discuss the operations in FIG. 6, database 403 in ENUM server 105 stores NAPTR records of IP telephones 101 and 102 shown in FIG. 5.

In video capture process in FIG. 6, camera 103A captures an image of a user of IP telephone 101, saves still image data on Web server 103B as a file name "user81310000000.html" under an address "http://www.tokyo1.sip.com" and periodically updates the still image to generate partial motion image. Likewise, camera 104A captures an image of a user of IP telephone 102, saves still image data on Web server 104B as a file name "user81310000001.html" under an address "http://www.tokyo2.sip.com" and periodically updates the still image to generate partial motion image.

When setup is completed, including connection to IP network 107, and power is turned ON on IP telephone 101, CPU 201 inside IP telephone 101 transmits to CA 106 a message "Register" to register IP telephone 101 in CA 106 (step S601). The message "Register" includes a telephone number, a user ID, a password and the like of IP telephone 101.

When receiving the message "Register" from IP telephone 101, CA 106 registers the telephone number, the user ID, the password and the like included in the message "Register" and returns a message "200OK" to IP telephone 101 (step S602).

When setup is completed, including connection to IP network 107, and power is turned ON on IP telephone 102, CPU 201 inside IP telephone 102 transmits to CA 106 a message "Register" to register IP telephone 102 in CA 106 (step S603). The message "Register" includes a telephone number, a user ID, a password and the like of IP telephone 102.

When receiving the message "Register" from IP telephone 102, CA 106 registers the telephone number, the user ID, the password and the like included in the message "Register" and returns a message "200OK" to IP telephone 102 (step S604).

Then, when the user of IP telephone 101 dials the telephone number of IP telephone 102, CPU 201 transmits, to CA 106 through network I/F 205, a call request that includes a message "INVITE" having the telephone number "0310000001" of IP telephone 102 (step S605). When receiving from IP telephone 101 the call request that includes the message "INVITE," CA 106 extracts, from a "To" header included in the message "INVITE," the IP telephone number of destination IP telephone 102 and transmits to IP telephone 102 the call request that includes the message "INVITE," based on the IP telephone number (step S606).

When receiving from CA 106 the call request that includes the message "INVITE," IP telephone 102 rings to inform the user of an incoming call and transmits a message "180ringing" to CA 106 (step S607). CA 106 then transmits to source IP telephone 101 the message "180ringing" received from IP telephone 102 (step S608).

When receiving the message "180ringing" from IP telephone 102, IP telephone 101 beeps a ring back tone from the speaker of handset 203 to inform the user that destination IP telephone 102 is being called. When detecting user's off-hook operation on handset 203, destination IP telephone 102 transmits to CA 106 the message "200OK" to allow connection (step S609).

When receiving the message "200OK" from IP telephone 102, CA 106 transmits the message "200OK" to IP telephone 101 (step S610). When receiving the message "200OK" from CA 106, IP telephone 101 transmits a message "ACK" to CA 106 (step S611). CA 106 then transmits to IP telephone 102 the message "ACK" received from IP telephone 101 (step S612).

When IP telephone 102 receives the message "ACK" from CA 106, IP telephones 101 and 102 are ready to communicate.

To inquire NAPTR records of IP telephone 102, IP telephone 101 then transmits to ENUM server 105 a message "IP telephone 102 NAPTR query," based on the telephone number of IP telephone 102 (step S613). When receiving the message "IP telephone 102 NAPTR query" from IP telephone 101, ENUM server 105 retrieves from database 403 the NAPTR records of IP telephone 102 and returns to IP telephone 101 a message "ENUM reply" that includes the retrieved NAPTR records (step S614).

When receiving the message "ENUM reply" from ENUM server 105, IP telephone 101 extracts an http address "http://www.tokyo2.sip.com/user81310000001.html" from the NAPTR records included in the message "ENUM reply" and transmits to Web server 104B a message "access request to Web 104B URL" that includes the http address (step S615).

When receiving from IP telephone 101 the message "access request to Web 104B URL," Web server 104B returns to IP telephone 101 a message "reply to Web 104B access" (step S616). At this stage, IP telephone 101 is ready to receive from Web server 104B an HTML file of still image data captured by camera 104A.

To inquire NAPTR records of IP telephone 101, IP telephone 102 then transmits to ENUM server 105 a message "IP telephone 101 NAPTR query," based on the telephone number of IP telephone 101 (step S617). When receiving the message "IP telephone 101 NAPTR query" from IP telephone 102, ENUM server 105 retrieves from database 403 the NAPTR records of IP telephone 101 and returns to IP telephone 102 a message "ENUM reply" that includes the retrieved NAPTR records (step S618).

When receiving the message "ENUM reply" from ENUM server 105, IP telephone 102 extracts an http address "http://www.tokyo1.sip.com/user81310000000.html" from the NAPTR records included in the message "ENUM reply" and transmits to Web server 103B a message "access request to Web 103B URL" that includes the http address (step S619).

When receiving from IP telephone 102 the message "access request to Web 103B URL," Web server 103B returns to IP telephone 102 a message "reply to Web 103B access" (step S620).

Then, IP telephone 102 is ready to receive from Web server 103B an HTML file of still image data captured by camera 103A. Display 204 of IP telephone 101 sequentially displays still images captured by network camera 104. Meanwhile, display 204 of IP telephone 102 sequentially displays still images captured by network camera 103. The users of IP telephones 101 and 102 are able to talk while looking at each other's partial motion image.

Figure 7:
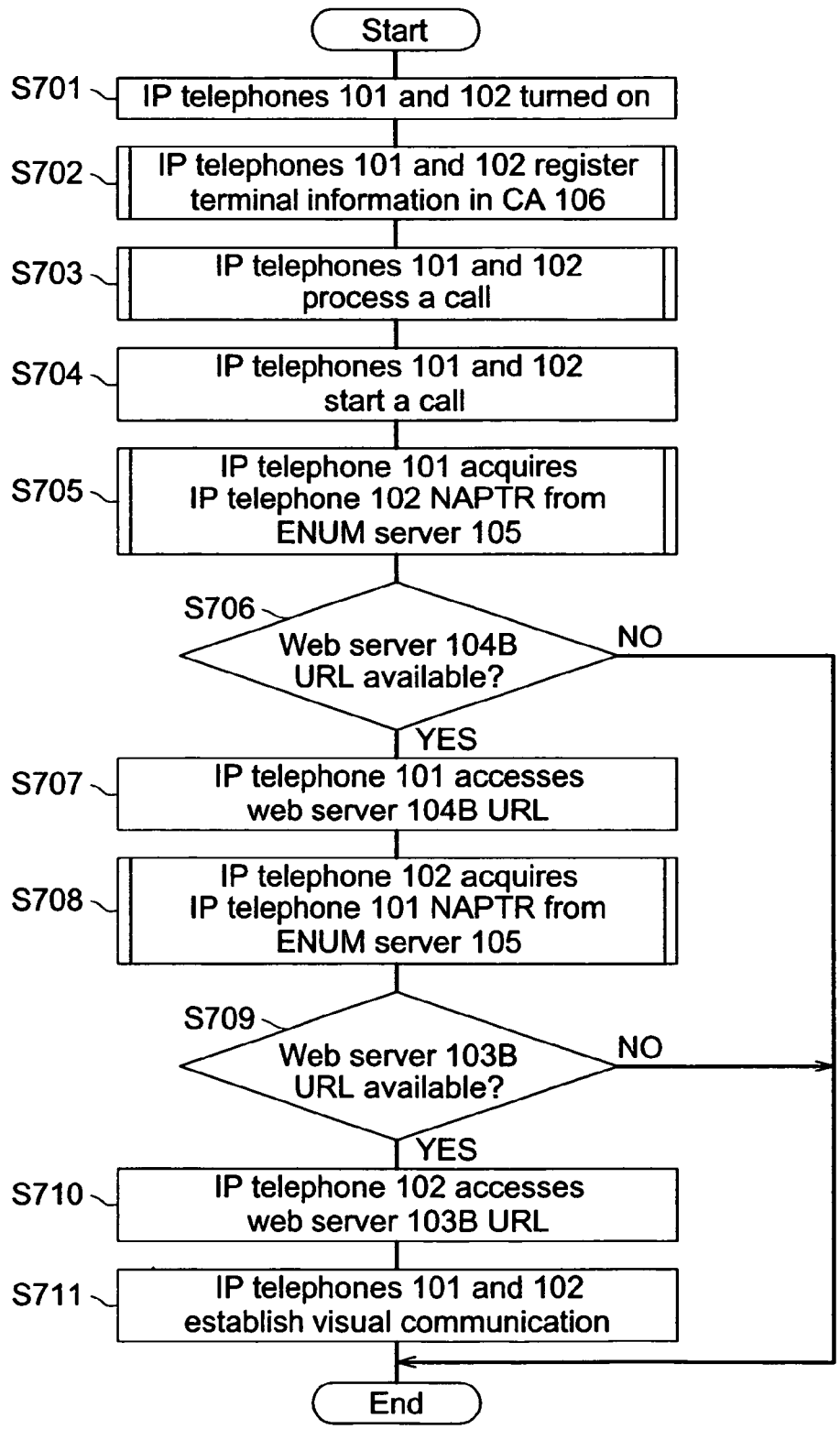
FIG. 7 illustrates a flowchart describing operations of the IP telephone system in the sequence diagram of FIG. 6.

Next, operations of IP telephones 101 and 102 shown in the sequence diagram of FIG. 6 are discussed with reference to a flowchart in FIG. 7.

When setup is completed, including connection to IP network 107, and power is turned ON on IP telephones 101 and 102 (step S701), CPU's 201 inside IP telephones 101 and 102 register terminal information of IP telephones 101 and 102 respectively in CA 106 (step S702, refer to above-described steps S601 to S604). Each piece of terminal information includes the telephone number, the user ID, the password and the like of one of IP telephones 101 and 102.

When the user of IP telephone 101 dials the telephone number of IP telephone 102, IP telephones 101 and 102 process a call (step S703, refer to above-described steps S605 to S612) and start the call (step S704).

To inquire the NAPTR records of IP telephone 102, IP telephone 101 then transmits to ENUM server 105 the message "IP telephone 102 NAPTR query" and acquires the NAPTR records of IP telephone 102 (step S705, refer to above-described steps S613 and S614).

When acquiring the NAPTR records from the message "ENUM reply" received from ENUM server 105, IP telephone 101 determines whether or not the NAPTR records include the URL of Web server 104B to which IP telephone 102 is connected (step S706). When confirming that the Web server 104B URL is included (step S706: Yes), IP telephone 101 proceeds to step S707.

Based on the http address "http://www.tokyo2.sip.com/user81310000001.html" of Web server 104B included in the NAPTR records, IP telephone 101 accesses Web server 104B (step S707). At this stage, IP telephone 101 is ready to receive from Web server 104B an HTML file of still image data captured by camera 104A.

To inquire the NAPTR records of IP telephone 101, IP telephone 102 then transmits to ENUM server 105 the message "IP telephone 101 NAPTR query" and acquires the NAPTR records of IP telephone 101 (step S708, refer to above-described steps S617 and S618).

When acquiring the NAPTR records from the message "ENUM reply" received from ENUM server 105, IP telephone 102 determines whether or not the NAPTR records include the URL of Web server 103B to which IP telephone 101 is connected (step S709). When confirming that the Web server 103B URL is included (step S709: Yes), IP telephone 102 proceeds to step S710.

Based on the http address "http://www.tokyo1.sip.com/user81310000000.html" of Web server 103B included in the NAPTR records, IP telephone 102 accesses Web server 103B (step S710). At this stage, IP telephone 102 is ready to receive from Web server 103B an HTML file of still image data captured by camera 103A.

When confirming in step S706 that no Web server 104B URL is included (step S706: No), IP telephone 101 aborts and terminates the process. When confirming in step S709 that no Web server 103B URL is included (step S709: No), the IP telephone 102 aborts and terminates the process.

Upon completing the operations above, IP telephones 101 and 102 establish visual communication (step S711). Display 204 of IP telephone 101 sequentially displays still images captured by network camera 104; Display 204 of IP telephone 102 sequentially displays still images captured by network camera 103. Users of IP telephones 101 and 102 are able to enjoy visual communication, that is, to talk while looking at each other's partial motion image.

As discussed above, IP telephone system 100 according to the first embodiment offers procedures where IP telephone 101 (102) acquires the Web server 104B (103B) URL from ENUM server 105 to start communication of still image data captured by network camera 104 (103).

IP telephone system 100, therefore, requires no additional hardware for encoding and decoding motion image. IP telephone 101 (102) also requires no extra software for encoding and decoding motion image, achieving inexpensive visual communication.

The above-described first embodiment explains a case where IP telephone 101 places a call to IP telephone 102. The same sequences and flow apply when IP telephone 102 places a call to IP telephone 101.

Second Embodiment

The second embodiment describes establishment of visual communication in an IP telephone system to which a DNS server is connected.

Figure 8:
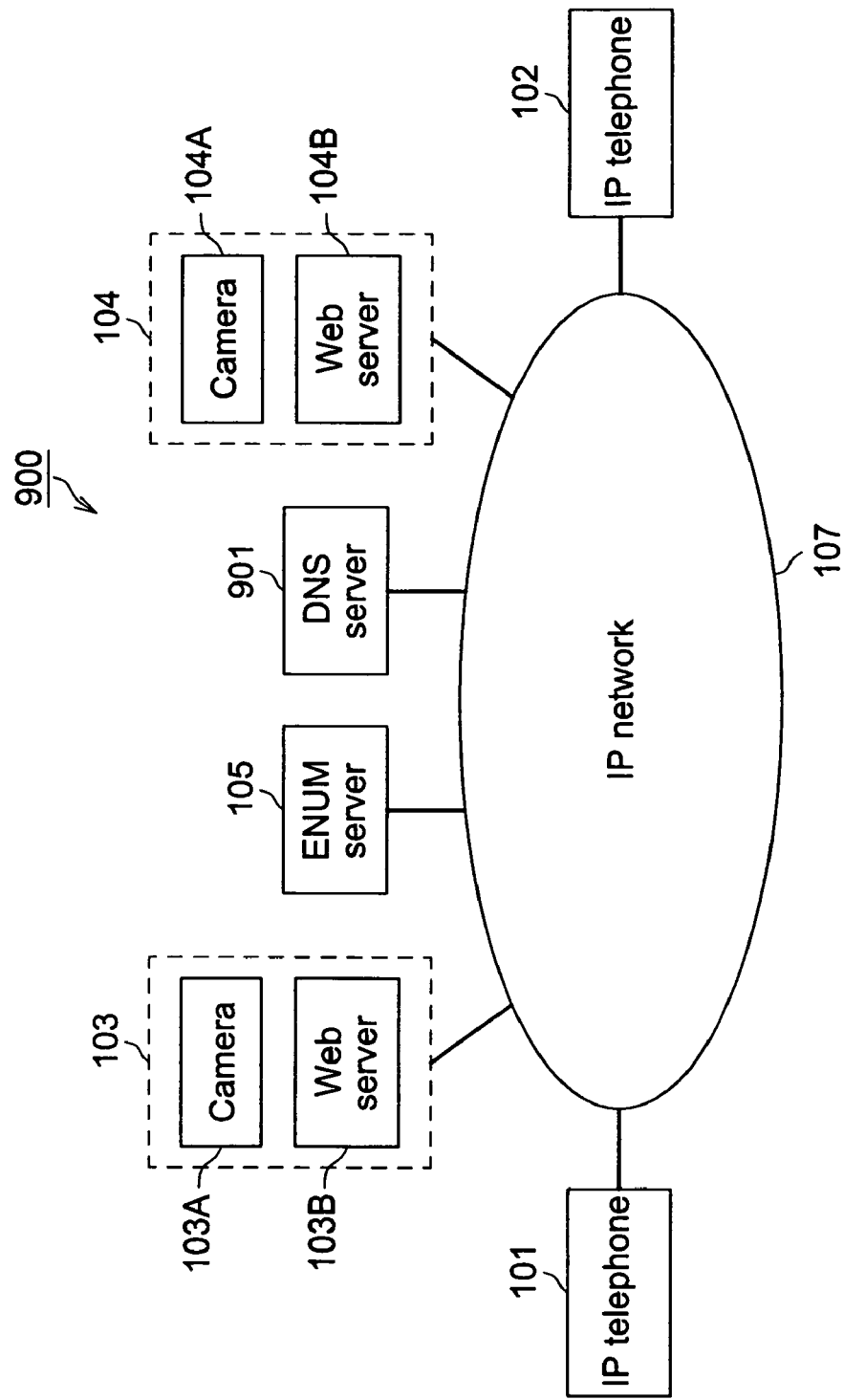
FIG. 8 illustrates an IP telephone system configuration according to a second embodiment of the present invention.

FIG. 8 illustrates an overall configuration of IP telephone system 900 according to the second embodiment. The same numbers apply to parts identical to those in IP telephone system 100 of FIG. 1, and explanation on the parts is omitted.

In IP telephone system 900 shown in FIG. 8, the difference from the first embodiment includes that DNS server 901 is connected to IP telephone system 900, replacing CA 106 connected to IP telephone system 100 of FIG. 1, and that a function to access DNS server 901 is added to IP telephone 101 (102).

DNS (Domain Name System) server 901 has a database that stores a URI specified in NAPTR records and an IP address corresponding to the URI. In response to a query from IP telephone 101 (102), DNS server 901 returns to IP telephone 101 (102) an IP address stored on the database.

FIG. 9 shows an example of NAPTR records stored on database 403 in ENUM server 105 according to the second embodiment. In the example of FIG. 9, the NAPTR records are stored corresponding to domain names obtained from telephone numbers "0310000000" and "0310000001."

In FIG. 9, URI's "!^.*$!sip:81310000000.tokyo.sip.jp" and "!^.*$!http://www.tokyo1.sip.com/user81310000000.html" correspond to a domain name "0.0.0.0.0.0.0.1.3.1.8.e164.arpa," obtained from the telephone number "0310000000." The service field of the former URI includes "E2U+sip," indicating that SIP (Session Initiation Protocol) is supported. The service field of the latter URI includes "E2U+http," indicating that http (hyper text transfer protocol) is supported.

A description "http://twww.tokyo1.sip.com/user81310000000.html" in the URI represents an http address of Web server 103B.

Similarly, URI's "!^.*$!sip:81310000001.tokyo.sip.jp" and "!^.*$!http://www.tokyo2.sip.com/user8310000001.html" correspond to a domain name "1.0.0.0.0.0.0.1.3.1.8.e164.arpa," obtained from the telephone number "0310000001." The service field of the former URI includes "E2U+sip," indicating that SIP is supported. The service field of the latter URI includes "E2U+http," indicating that http is supported.

A description "http://www.tokyo2.sip.com/user81310000001.html" in the URI represents an http address of Web server 104B.

Next, operations in IP telephone system 900 of FIG. 8 are discussed with reference to a sequence diagram in FIG. 10. The operations include a NAPTR records query of IP telephone 102 from IP telephone 101 to ENUM server 105; an IP address query of IP telephone 102 from IP telephone 101 to DNS server 901, based on a reply from ENUM server 105; and, after a call starts between IP telephones 101 and 102 based on the IP address, establishment of visual communication between IP telephones 101 and 102.

Figure 10:
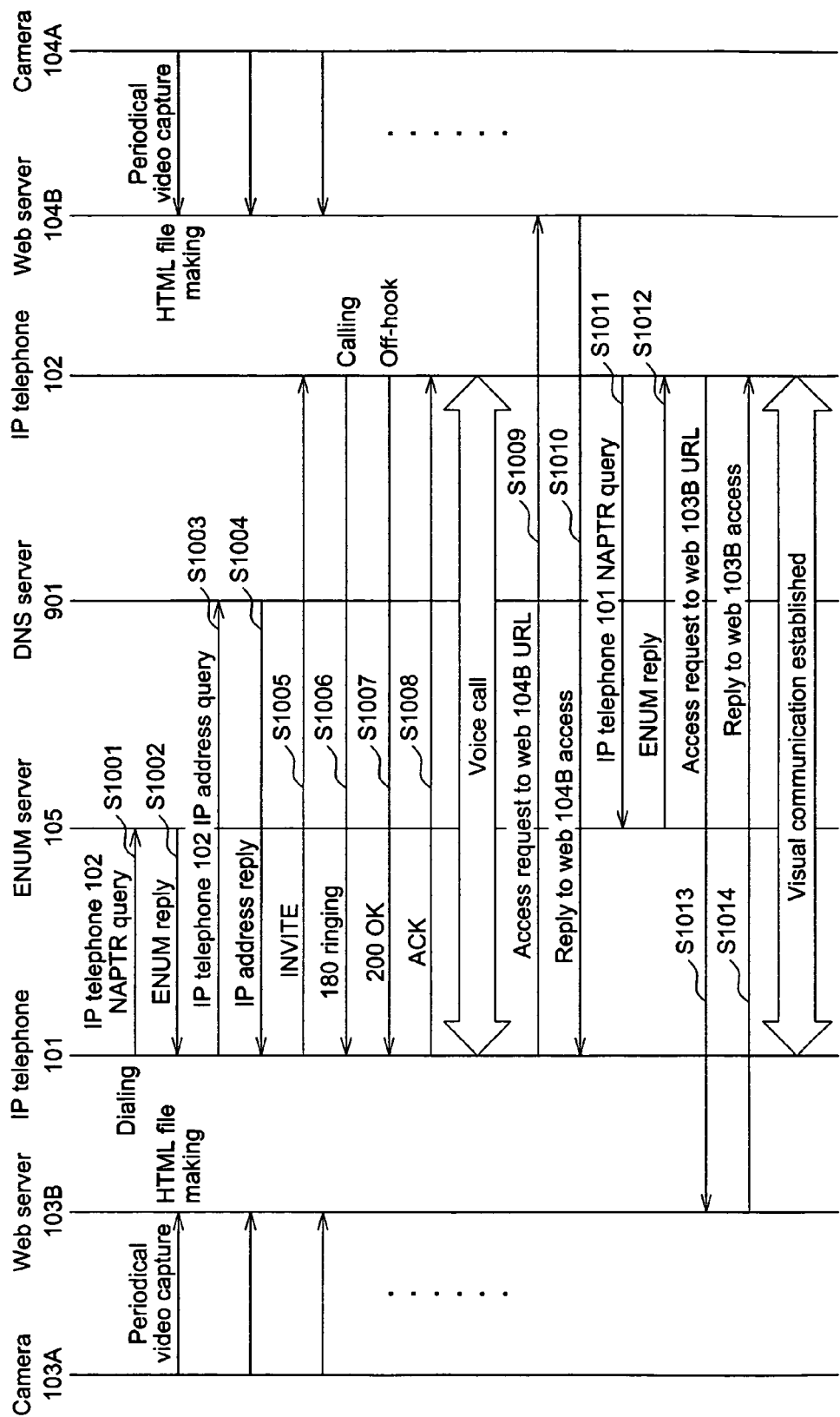
FIG. 10 illustrates a sequence diagram describing operations from call start between IP telephones to establishment of visual communication between the IP telephones in the IP telephone system according to the second embodiment.

As a premise to discuss the operations in FIG. 10, database 403 in ENUM server 105 stores NAPTR records of IP telephones 101 and 102 shown in FIG. 9. In video capture process, camera 103A captures an image of a user of IP telephone 101, saves still image data on Web server 103B and periodically updates the still image data. Likewise, camera 104A captures an image of a user of IP telephone 102, saves still image data on Web server 104B and periodically updates the still image data.

When the user of IP telephone 101 dials the telephone number of IP telephone 102, CPU 201 transmits to ENUM server 105 a message "IP telephone 102 NAPTR query" having the IP telephone number "0310000001" (step S1001).

When receiving the message "IP telephone 102 NAPTR query" from IP telephone 101, ENUM server 105, referring to the IP telephone number "0310000001" included in the message "IP telephone 102 NAPTR query," retrieves corresponding NAPTR records from database 403 and returns to IP telephone 101 a message "ENUM reply" that includes the retrieved NAPTR records (step S1002).

The URI's "!^.*$!sip:81310000001.tokyo.sip.jp" and "!^.*$!http://www.tokyo2.sip.com/user81310000001.html" that correspond to the domain name "1.0.0.0.0.0.0.1.3.1.8.e164.arpa," as shown in FIG. 9, are returned to IP telephone 101.

When receiving the message "ENUM reply" from ENUM server 105, IP telephone 101 then extracts the URI "!^.*$!sip:81310000001.tokyo.sip.jp" from the NAPTR records included in the message "ENUM reply" and transmits to DNS server 901 a message "IP telephone 102 IP address query" that includes the URI (step S1003).

When receiving the message "IP telephone 102 IP address query" from IP telephone 101, DNS server 901, referring to the URI "!^.*$!sip:81310000001.tokyo.sip.jp" included in the message "IP telephone 102 IP address query," retrieves from the database an IP address of IP telephone 102 and returns to IP telephone 101 a message "IP address reply" that includes the IP address (step S1004).

When receiving the message "IP address reply" from DNS server 901, IP telephone 101 transmits to IP telephone 102 a call request that includes a message "INVITE," based on the IP address included in the message "IP address reply" (step S1005). When receiving from IP telephone 101 the call request that includes the message "INVITE," IP telephone 102 rings to inform the user of an incoming call and transmits a message "180ringing" to IP telephone 101 (step S1006).

When receiving the message "180ringing" from IP telephone 102, IP telephone 101 beeps a ring back tone from the speaker of handset 203 to inform the user that destination IP telephone 102 is being called. When detecting user's off-hook operation on handset 203, destination IP telephone 102 transmits to IP telephone 101 a message "200OK" to allow connection (step S1007).

When receiving the message "200OK" from IP telephone 102, IP telephone 101 transmits a message "ACK" to IP telephone 102 (step S1008). When IP telephone 102 receives the message "ACK" from IP telephone 101, IP telephones 101 and 102 are ready to communicate.

IP telephone 101 then extracts an http address "http://www.tokyo2.sip.com/user81310000001.html" from the NAPTR records of IP telephone 102 received from ENUM server 105 in step S1002 above and transmits to Web server 104B a message "access request to Web 104B URL" that includes the http address (step S1009).

When receiving from IP telephone 101 the message "access request to Web 104B URL," Web server 104B returns to IP telephone 101 a message "reply to Web 104B access" (step S1010). At this stage, IP telephone 101 is ready to receive from Web server 104B an HTML file of still image data captured by camera 104A.

IP telephone 102 then transmits to ENUM server 105 a message "IP telephone 101 NAPTR query," based on the telephone number of IP telephone 101 (step S1011). When receiving the message "IP telephone 101 NAPTR query" from IP telephone 102, ENUM server 105 retrieves corresponding NAPTR records from database 403 and returns to IP telephone 102 a message "ENUM reply" that includes the retrieved NAPTR records (step S1012).

The URI's "!^.*$!sip:81310000000.tokyo.sip.jp" and "!^.*$!http://www.tokyo1.sip.com/user81310000000.html" that correspond to the domain name "0.0.0.0.0.0.0.1.3.1.8.e164.arpa," as shown in FIG. 9, are returned to IP telephone 102.

When receiving the message "ENUM reply" from ENUM server 105, IP telephone 102 extracts an http address "http://www.tokyo1.sip.com/user81310000000.html" from the NAPTR records included in the message "ENUM reply" and transmits to Web server 103B a message "access request to Web 103B URL" that includes the http address (step S1013).

When receiving from IP telephone 102 the message "access request to Web 103B URL," Web server 103B returns to IP telephone 102 a message "reply to Web 103B access" (step 1014).

Then, IP telephone 102 is ready to receive from Web server 103B an HTML file of still image data captured by camera 103A. Display 204 of IP telephone 101 sequentially displays still images captured by network camera 104; Display 204 of IP telephone 102 sequentially displays still images captured by network camera 103. The users of IP telephones 101 and 102 are able to enjoy visual communication, that is, to talk while looking at each other's partial motion image.

Figure 11:
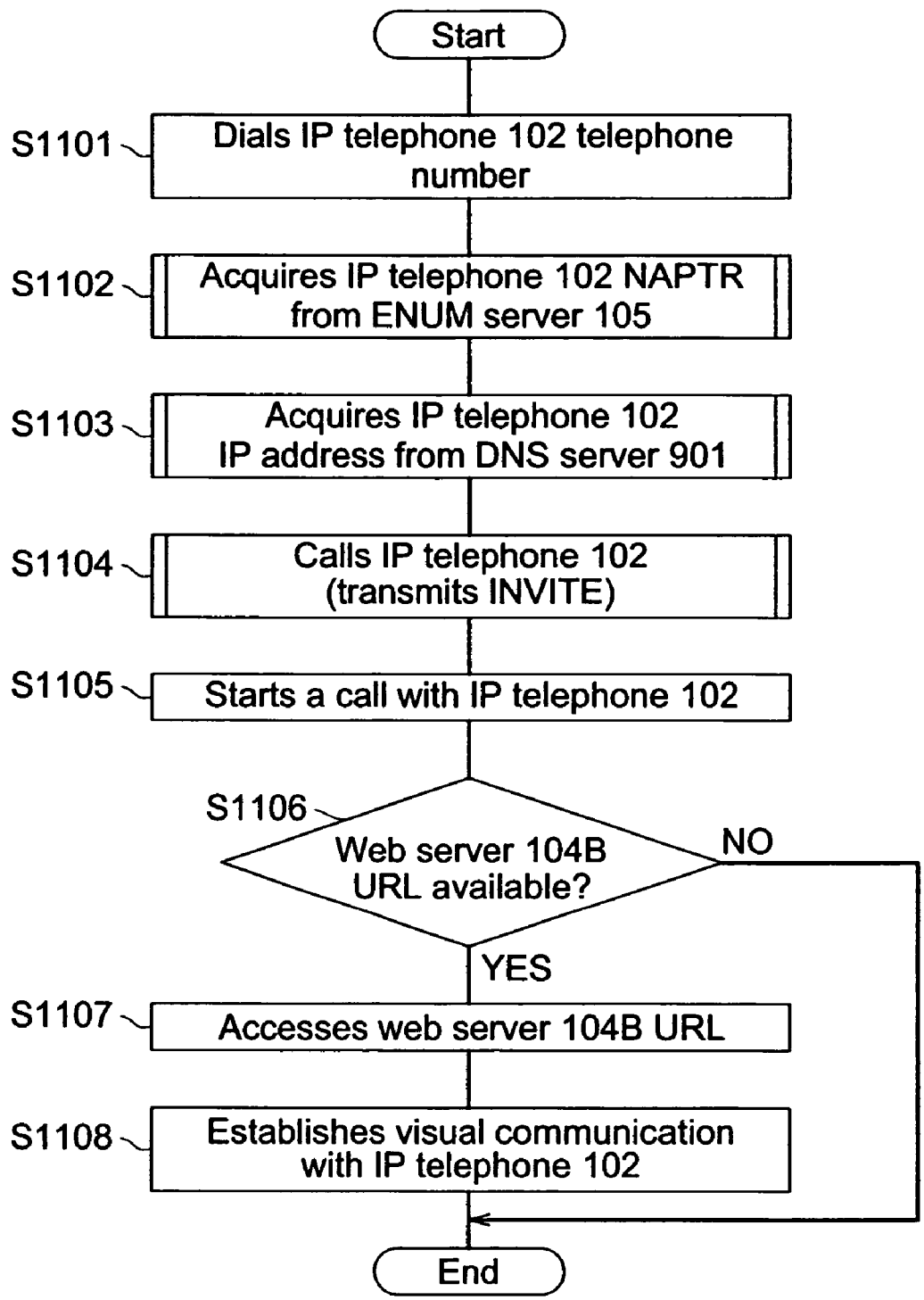
FIG. 11 illustrates a flowchart describing operations of a source IP telephone in the sequence diagram of FIG. 10.
Figure 12:
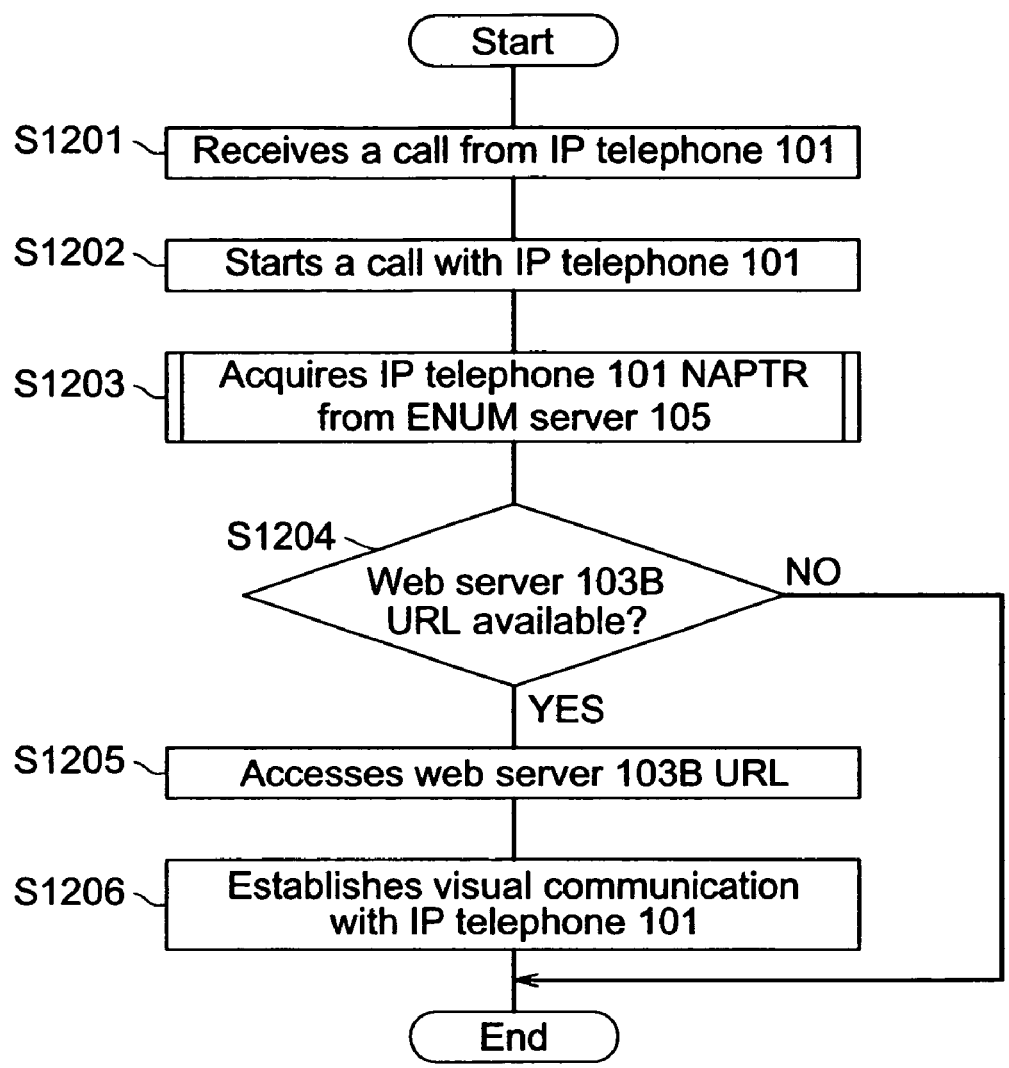
FIG. 12 illustrates a flowchart describing operations of a destination IP telephone in the sequence diagram of FIG. 10.

Next, operations of IP telephones 101 and 102 shown in the sequence diagram of FIG. 10 are discussed with reference to flowcharts in FIGS. 11 and 12. FIG. 11 is a flowchart illustrating the operations of IP telephone 101. FIG. 12 is a flowchart illustrating the operations of IP telephone 102.

When the user of IP telephone 101 dials the telephone number of IP telephone 102 (step S1101), IP telephone 101 transmits to ENUM server 105 the message "IP telephone 102 NAPTR query" in order to inquire the NAPTR records of IP telephone 102 and acquires the NAPTR records of IP telephone 102 (step S1102, refer to above-described steps S1001 and S1002).

When acquiring the NAPTR records from the message "ENUM reply" received from ENUM server 105, IP telephone 101 extracts the URI "!^.*$!sip:81310000001.tokyo.sip.jp" from the NAPTR records, transmits to DNS server 901 the message "IP telephone 102 address query" that includes the URI and acquires the IP address of IP telephone 102 (step S1103, refer to above-described steps S1003 and S1004).

When acquiring the IP address of IP telephone 102 from the message "IP address reply" received from DNS server 901, IP telephone 101 transmits to IP telephone 102 the call request that includes the message "INVITE," based on the IP address, in order to place a call to IP telephone 102 (step S1104, refer to above-described steps S1005 to S1008). Then, IP telephones 101 and 102 start the call (step S1105).

IP telephone 101 then determines whether or not the NAPTR records, received from ENUM server 105 in step S1102 above, include the URL of Web server 104B to which IP telephone 102 is connected (step S1106). When confirming that the Web server 104B URL is included (step S1106: Yes), IP telephone 101 proceeds to step S1107.

Based on the Web server 104B URL "http://www.tokyo2.sip.com/user81310000001.html" included in the NAPTR records, IP telephone 101 accesses Web server 104B (step S1107). At this stage, IP telephone 101 is ready to receive from Web server 104B an HTML file of still image data (step S1108).

When confirming in step S1106 that no Web server 104B URL is included (step S1106: No), IP telephone 101 aborts and terminates the process.

Next, in FIG. 12, when receiving a call from IP telephone 101 (step S1201), IP telephone 102 starts the call with IP telephone 101 (step S1202). IP telephone 102 then transmits to ENUM server 105 the message "IP telephone 101 NAPTR query" in order to inquire the NAPTR records of IP telephone 101 and acquires the NAPTR records of IP telephone 101 (step S1203, refer to above-described steps S1011 and S1012).

When acquiring the NAPTR records from the message "ENUM reply" received from ENUM server 105, IP telephone 102 determines whether or not the NAPTR records include the URL of Web server 103B to which IP telephone 101 is connected (step S1204). When confirming that the Web server 103B URL is included (step S1204: Yes), IP telephone 102 proceeds to step S1205.

Based on the Web server 103B URL "http://www.tokyo1.sip.com/user8131000000.html" included in the NAPTR records, IP telephone 102 accesses Web server 103B (step S1205). At this stage, IP telephone 102 is ready to receive from Web server 103B an HTML file of still image data (step S1206).

When confirming in step S1204 that no Web server 103B URL is included (step S1204: No), IP telephone 102 aborts and terminates the process.

IP telephone 102 is then ready to receive from Web server 103B an HTML file of still image data. Display 204 of IP telephone 101 sequentially displays still images captured by network camera 104; Display 204 of IP telephone 102 sequentially displays still images captured by network camera 103.

As discussed above, IP telephone system 900 according to the second embodiment offers procedures for establishing communication of partial motion image, where IP telephone 101 acquires from ENUM server 105 the NAPTR records of IP telephone 102; acquires from DNS server 901 the IP address of IP telephone 102, based on the URI included in the NAPTR records; establishes a call with IP telephone 102; and then starts communication of image data captured by network camera 104, based on the Web server 104B URL received from ENUM server 105.

Therefore, IP telephone system 900 to which DNS server 901 is connected requires no additional hardware for encoding and decoding motion image. IP telephone 101 (102) also requires no extra software for encoding and decoding motion image, achieving inexpensive visual communication.

The above-described second embodiment explains a case where IP telephone 101 places a call to IP telephone 102. The same sequences and flow apply when IP telephone 102 places a call to IP telephone 101.

Third Embodiment

The third embodiment describes establishment of visual communication in an IP telephone system where a personal computer is connected to IP telephones 101 and 102 respectively. The personal computer has a telephone number input function based on a Web browser and an ENUM client function.

Figure 13:
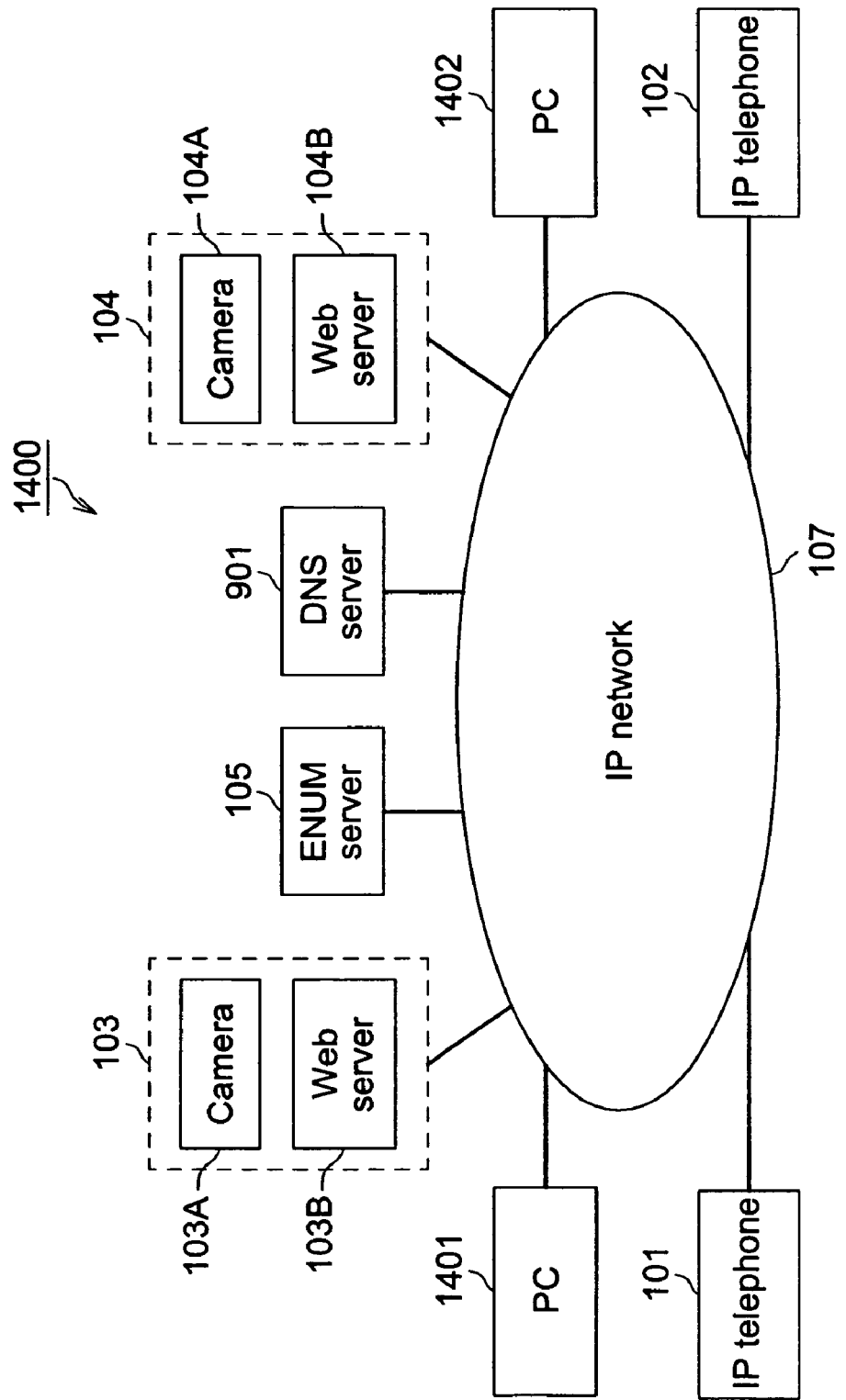
FIG. 13 illustrates an IP telephone system configuration according to a third embodiment of the present invention.

FIG. 13 illustrates an overall configuration of IP telephone system 1400 according to the third embodiment. The same numbers apply to parts identical to those in IP telephone system 100 of FIG. 1 and IP telephone system 900 of FIG. 9, and explanation on the parts is omitted.

In IP telephone system 1400 shown in FIG. 13, the difference from the second embodiment includes that personal computers (hereinafter referred to as PC's) 1401 and 1402, having the telephone number input function based on the Web browser and the ENUM client function, are further connected to IP telephone system 900 and that a communication function is added to IP telephones 101 and 102 to communicate with PC's 1401 and 1402 respectively.

Figure 14:
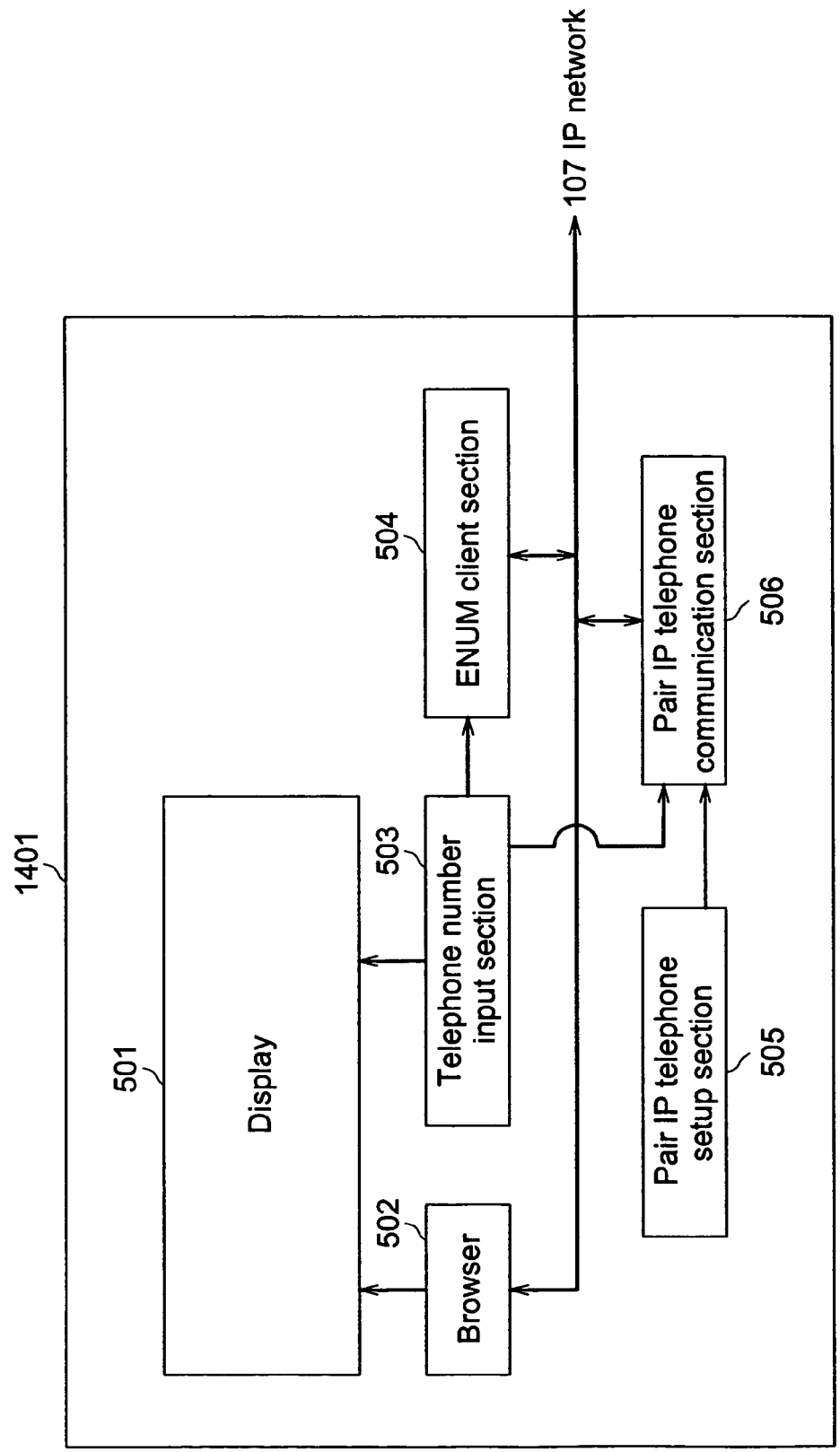
FIG. 14 illustrates a block diagram describing a PC configuration according to the third embodiment.

FIG. 14 is a block diagram that illustrates a PC 1401 configuration according to the third embodiment. PC 1402 has the same configuration as PC 1401.

As shown in FIG. 14, PC 1401 mainly includes display 501, browser 502, telephone number input section 503, ENUM client section 504, pair IP telephone setup section 505 and pair IP telephone communication section 506.

Display 501, configured with a liquid crystal panel and other parts, displays a Web browser based IP telephone operation screen, telephone book, partial motion image screen, telephone number and the like in a predetermined layout. The displayed items are based on IP telephone operation screen data, telephone book data and still image data input from browser 502 and telephone number data input from telephone number input section 503. Display 501 functions as a display.

Browser 502 has a communication function to receive an HTML file of still image data from Web server 104B of destination IP telephone 102 via IP network 107. Browser 502 also has a telephone screen display function to output, to display 501, Web browser based data, including IP telephone operation screen data, telephone book data and still image data obtained from the received HTML file, and to display on display 501 an IP telephone operation screen, a telephone book, a partial motion image screen and a telephone screen. Browser 502 functions as a visual communicator.

Telephone number input section 503 is an input device that a user operates when selecting a telephone number from a telephone book displayed on display 501 and directly entering a telephone number. Telephone number input section 503 has a telephone number display function to output to display 501 a signal of the user operation and to display on display 501 one of the selected and entered telephone numbers. Telephone number input section 503 also has a telephone number input function to input one of the selected and entered telephone numbers to ENUM client section 504 and pair IP telephone communication section 506.

ENUM client section 504 has an ENUM client function to transmit, to ENUM server 105 via IP network 107, a message "NAPTR query" of destination IP telephone 102 and to acquire an IP address of destination IP telephone 102 included in a message "NAPTR reply" that ENUM server 105 returns. ENUM client section 504 functions as a query transmitter and receiver.

Pair IP telephone setup section 505 is a memory that allows setting of IP telephone information of IP telephone 101 paired with PC 1401. Pair IP telephone communication section 506 has an IP telephone communication function to communicate a telephone number to IP telephone 101 that corresponds to the IP telephone information set in pair IP telephone setup section 505, when the telephone number is input on telephone input section 503, and to start a call request to a destination IP telephone. Pair IP telephone communication section 506 functions as a telephone number transmitter.

ENUM server 105 stores on database 403 the NAPTR records of IP telephones 101 and 102 shown in FIG. 9.

In IP telephone system 1400 of FIG. 14, when a telephone number is input on PC 1401 using the telephone number input function, the destination telephone number is communicated to IP telephone 101 preset as above. IP telephone 101 then starts a call request; inquires to ENUM server 105 for NAPTR records of IP telephone 102; inquires to DNS server 901 for an IP address of IP telephone 102, based on a reply from ENUM server 105; and starts a call with IP telephone 102, based on the IP address. Following the call start, PC's 1401 and 1402 establish visual communication. Operations until visual communication is established are discussed with reference to a sequence diagram in FIG. 15.

Figure 15:
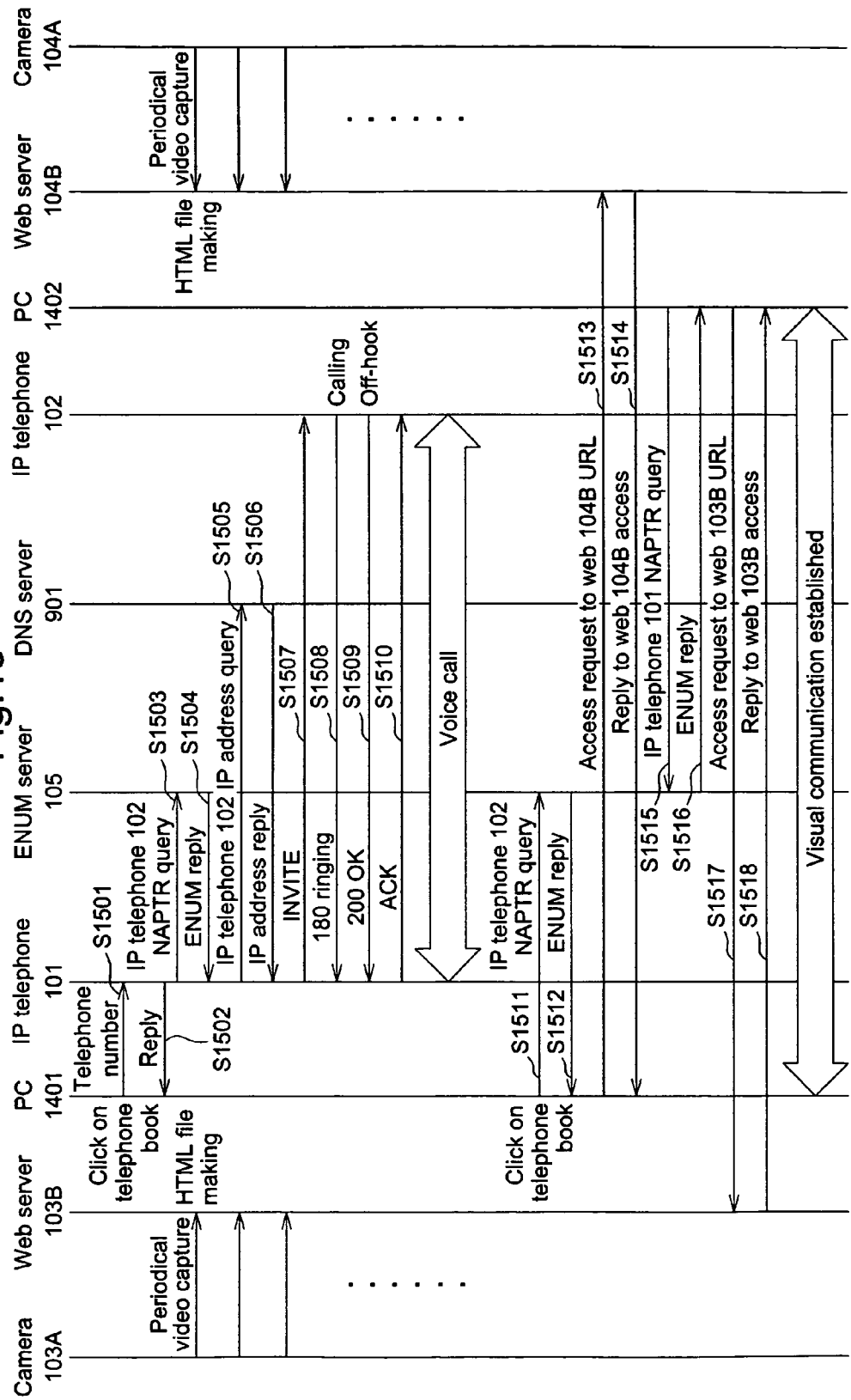
FIG. 15 illustrates a sequence diagram describing operations from call start between IP telephones to establishment of visual communication between the IP telephones in the IP telephone system according to the third embodiment.

As a premise to discuss the operations in FIG. 15, database 403 in ENUM server 105 stores the NAPTR records of IP telephones 101 and 102 shown in FIG. 9.

In video capture process, camera 103A captures an image of a user of IP telephone 101, saves still image data on Web server 103B and periodically updates the still image data. Likewise, camera 104A captures an image of a user of IP telephone 102, saves still image data on Web server 104B and periodically updates the still image data.

When a user of PC 1401 inputs a telephone number "0310000001" of IP telephone 102 from a telephone book, PC 1401 transmits the telephone number "0310000001" to IP telephone 101, preset in pair IP telephone setup section 505 of PC 1401 (step S1501). After inputting the telephone number of IP telephone 102, the user of PC 1401 sets handset 203 of IP telephone 101 to off-hook and waits for a called party to answer a call.

When receiving the destination telephone number from PC 1401, IP telephone 101 returns a reply message to PC 1401 (step S1502). IP telephone 101 also transmits to ENUM server 105 a message "IP telephone 102 NAPTR query" having the destination telephone number "0310000001" (step S1503).

When receiving from IP telephone 101 the message "IP telephone 102 NAPTR query," ENUM server 105, referring to the telephone number "0310000001" included in the message "IP telephone 102 NAPTR query," retrieves corresponding NAPTR records from database 403 and returns to IP telephone 101 a message "ENUM reply" that includes the retrieved NAPTR records (step S1504).

The URI's "!^.*$!sip:81310000001.tokyo.sip.jp" and "!^.*$!http://www.tokyo2.sip.com/user81310000001.html" that correspond to the domain name "1.0.0.0.0.0.0.1.3.1.8.e164.arpa," as shown in FIG. 9, are returned to IP telephone 101.

When receiving the message "ENUM reply" from ENUM server 105, IP telephone 101 extracts the URI "!^.*$!sip:81310000001.tokyo.sip.jp" from the NAPTR records included in the message "ENUM reply" and transmits to DNS server 901 a message "IP telephone 102 IP address query" that includes the URI (step S1505).

When receiving from IP telephone 101 the message "IP telephone 102 IP address query," DNS server 901, referring to the URI "!^.*$!sip:81310000001.tokyo.sip.jp" included in the message "IP telephone 102 IP address query," retrieves from a database an IP address of IP telephone 102 and returns to IP telephone 101 a message "IP address reply" that includes the IP address (step S1506).

When receiving the message "IP address reply" from DNS server 901, IP telephone 101 transmits to IP telephone 102 a call request that includes a message "INVITE," based on the IP address included in the message "IP address reply" (step S1507).

When receiving from IP telephone 101 the call request that includes the message "INVITE," IP telephone 102 rings to inform the user of an incoming call and transmits a message "180ringing" to IP telephone 101 (step S1508).

When receiving the message "180ringing" from IP telephone 102, IP telephone 101 beeps a ring back tone from a speaker of handset 203 to inform the user that destination IP telephone 102 is being called. When detecting user's off-hook operation on handset 203, destination IP telephone 102 transmits to IP telephone 101 a message "200OK" to allow connection (step S1509).

When receiving the message "200OK" from IP telephone 102, IP telephone 101 transmits a message "ACK" to IP telephone 102 (step S1510). When IP telephone 102 receives the message "ACK" from IP telephone 101, IP telephones 101 and 102 are ready to communicate.

To inquire a URL of Web server 104B that stores still image data of the user of IP telephone 102, PC 1401 then activates ENUM client section 504, responding to the user input of the destination telephone number, and transmits to ENUM server 105 the message "IP telephone 102 NAPTR query" having the telephone number "0310000001" of IP telephone 102 (step S1511). When receiving from PC 1401 the message "IP telephone 102 NAPTR query," ENUM server 105, referring to the telephone number "0310000001" included in the message "IP telephone 102 NAPTR query," retrieves the corresponding NAPTR records from database 403 and returns to PC 1401 the message "ENUM reply" that includes the retrieved NAPTR records (step S1512).

The URI's "!^.*$!sip:81310000001.tokyo.sip.jp" and "!^.*$!http://www.tokyo2.sip.com/user81310000001.html" that correspond to the domain name "1.0.0.0.0.0.0.1.3.1.8.e164.arpa," as shown in FIG. 9, are returned to PC 1401.

When receiving the message "ENUM reply" from ENUM server 105, PC 1401 extracts an http address "http://www.tokyo2.sip.com/user81310000001.html" from the NAPTR records included in the message "ENUM reply" and transmits to Web server 104B a message "access request to Web 104B URL" that includes the http address (step S1513).

When receiving from PC 1401 the message "access request to Web 104B URL," Web server 104B returns to PC 1401 a message "reply to Web 104B access" (step S1514). At this stage, PC 1401 is ready to receive from Web server 104B an HTML file of still image data captured by camera 104A.

After a call is established, the user of PC 1402 manually inputs a telephone number of IP telephone 101 on a browser and activates ENUM client section 504. To inquire a Web server 103B URL, PC 1402 transmits to ENUM server 105 a message "IP telephone 101 NAPTR query" having a telephone number "0310000000" (step S1515). When receiving from PC 1402 the message "IP telephone 101 NAPTR query," ENUM server 105, referring to the telephone number "0310000000" included in the message "IP telephone 101 NAPTR query," retrieves corresponding NAPTR records from database 403 and returns to PC 1402 a message "ENUM reply" that includes the retrieved NAPTR records (step S1516).

The URI's "!^.*$!sip:81310000000.tokyo.sip.jp" and "!^.*$!http://www.tokyo1.sip.com/user81310000000.html" that correspond to the domain name "0.0.0.0.0.0.0.1.3.1.8.e164.arpa," as shown in FIG. 9, are returned to PC 1402.

When receiving the message "ENUM reply" from ENUM server 105, PC 1402 extracts an http address "http://www.tokyo1.sip.com/user81310000000.html" from the NAPTR records included in the message "ENUM reply" and transmits to Web server 103B a message "access request to Web 103B URL" that includes the http address (step S1517).

When receiving from PC 1402 the message "access request to Web 103B URL," Web server 103B returns to PC 1402 a message "reply to Web 103B access" (step S1518).

PC 1402 is then ready to receive from Web server 103B an HTML file of still image data captured by camera 103A. Display 501 of PC 1401 sequentially displays still images captured by network camera 104; Display 501 of PC 1402 sequentially displays still images captured by network camera 103. The users of IP telephones 101 and 102 are able to enjoy visual communication, that is, to talk while looking at each other's partial motion image displayed on display 501 of PC 1401 and 1402.

Figure 16:
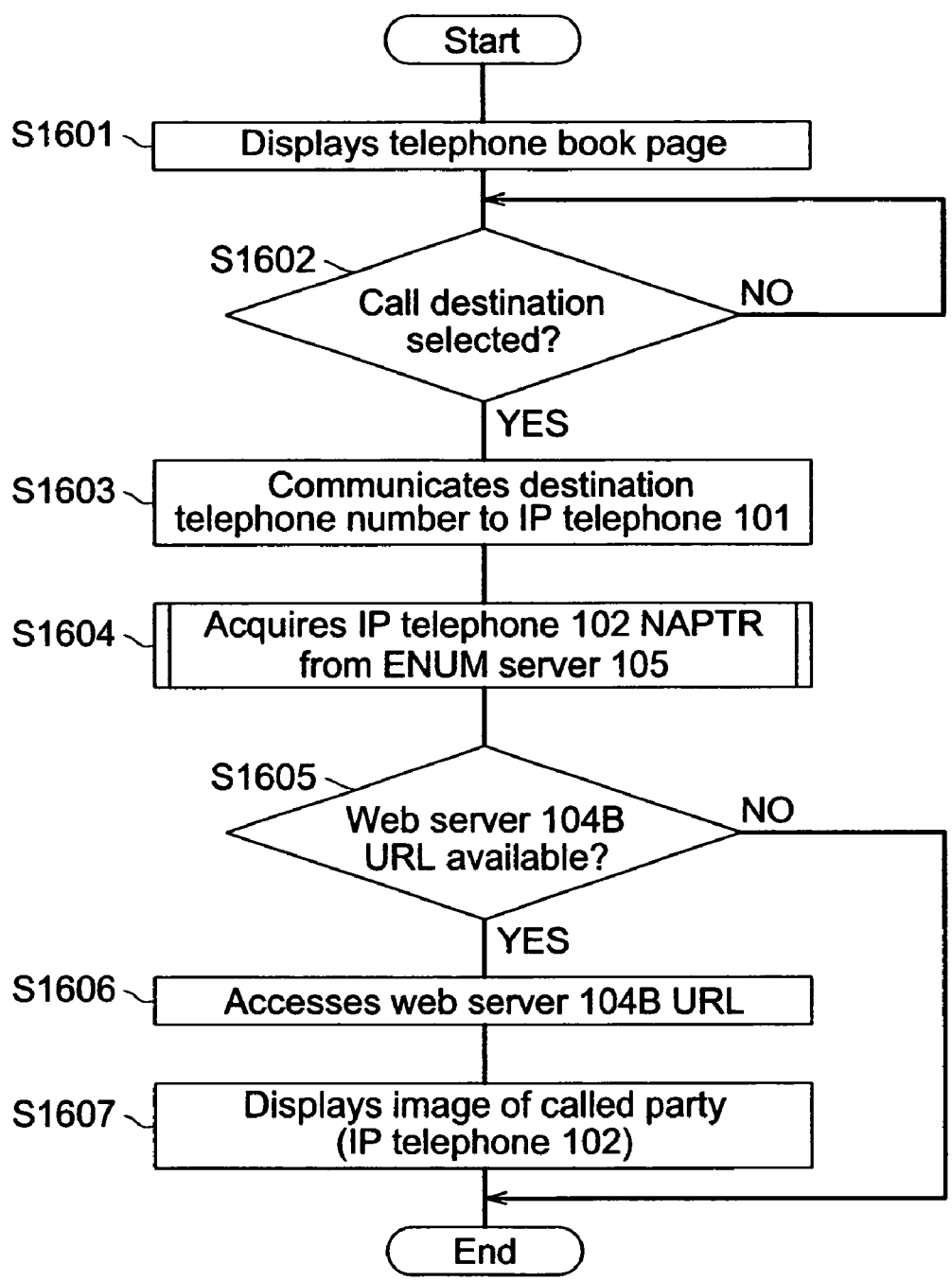
FIG. 16 illustrates a flowchart describing operations of a source PC in the sequence diagram of FIG. 15.
Figure 17:
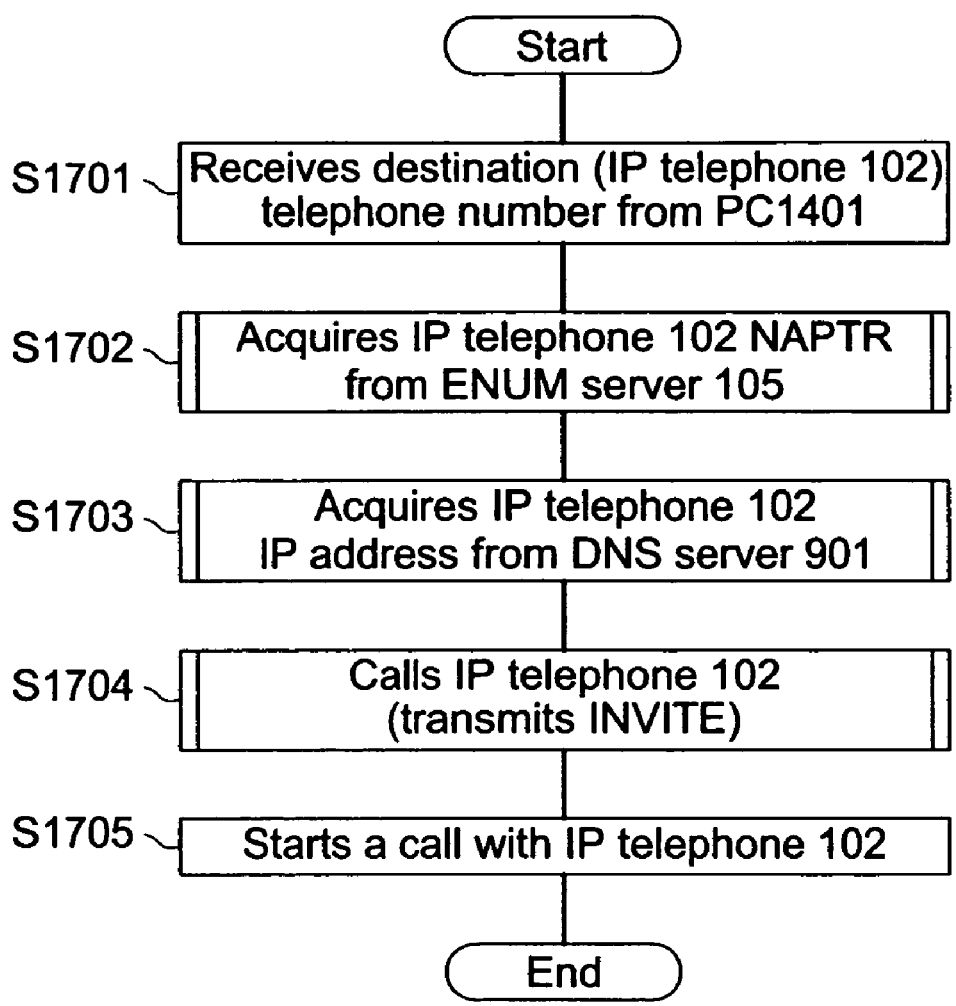
FIG. 17 illustrates a flowchart describing operations of a source IP telephone in the sequence diagram of FIG. 15.
Figure 18:
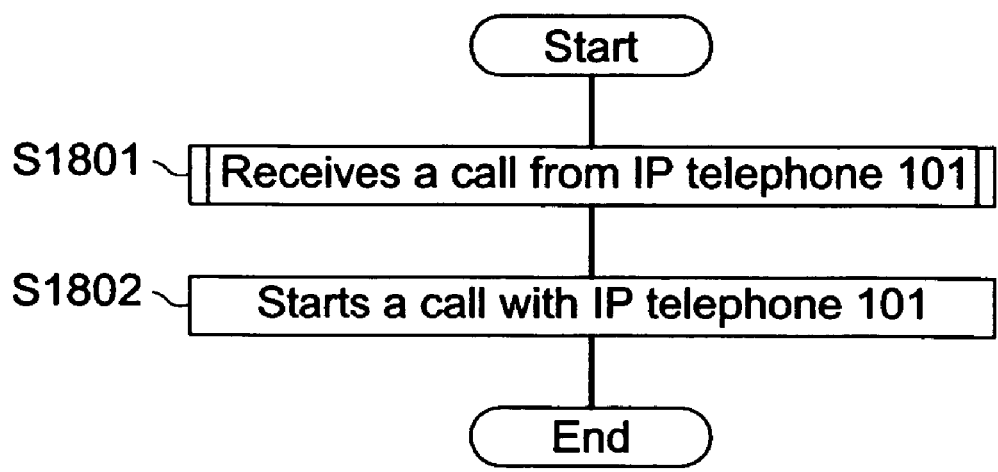
FIG. 18 illustrates a flowchart describing operations of a destination IP telephone in the sequence diagram of FIG. 15.

Next, operations of IP telephones 101 and 102 and PC's 1401 and 1402 shown in the sequence diagram of FIG. 15 are discussed with reference to flowcharts in FIGS. 16 to 19. FIG. 16 is a flowchart illustrating PC 1401 operations; FIG. 17 is a flowchart illustrating IP telephone 101 operations; FIG. 18 is a flowchart illustrating IP telephone 102 operations; and FIG. 19 is a flowchart illustrating PC 1402 operations.

PC 1401 displays a telephone book page on display 501 through browser 502 (step S1601) and determines whether or not a destination is selected from the telephone book, based on a selection instruction signal from the telephone number input section 503 (step S1602). When the user selects the telephone number "0310000001" of IP telephone 102 as a destination (step S1602: Yes), PC 1401 communicates the telephone number "0310000001" to IP telephone 101, preset in pair IP telephone setup section 505 of PC 1401 (step S1603).

To inquire a URL of Web server 104B that stores still image data of the user of IP telephone 102, PC 1401 then activates ENUM client section 504, responding to the user input of the destination telephone number; transmits to ENUM server 105 the message "IP telephone 102 NAPTR query" having the telephone number "0310000001" of IP telephone 102; and acquires the NAPTR records of IP telephone 102 (step S1604, refer to above-described steps S1511 and 1512).

When acquiring from ENUM server 105 the NAPTR records of IP telephone 102, PC 1401 determines whether or not the NAPTR records include the URL of Web server 104B to which IP telephone 102 is connected (step S1605). When confirming that the Web server 104B URL is included (step S1605: Yes), PC 1401 proceeds to step S1606.

Based on the Web server 104B URL "http://www.tokyo2.sip.com/user81310000001.html" included in the NAPTR records, PC 1401 accesses Web server 104B (step S1606). At this stage, PC 1401 is ready to receive from Web server 104B an HTML file of still image data (step S1607).

When confirming in step S1605 that no Web server 104B URL is included (step S1605: No), PC 1401 aborts and terminates the process.

In FIG. 17, when communicated from PC 1401 the telephone number "0310000001" of IP telephone 102 (step S1701), IP telephone 101 transmits to ENUM server 105 the message "IP telephone 102 NAPTR query" having the telephone number "0310000001" and acquires the NAPTR records of IP telephone 102 (step S1702).

When receiving the message "ENUM reply" from ENUM server 105, IP telephone 101 extracts the URI "!^.*$!Sip:81310000001.tokyo.sip.jp" from the NAPTR records included in the message "ENUM reply;" transmits to DNS server 901 the message "IP telephone 102 IP address query" that includes the URI; and acquires the IP address of IP telephone 102 (step 1703, refer to above-described steps S1505 and S1506).

When receiving the message "IP address reply" from DNS server 901, IP telephone 101 transmits to IP telephone 102 the call request that includes the message "INVITE," based on the IP address included in the message "IP address reply" in order to place a call to IP telephone 102 (step S1704, refer to above-described steps S1507 to S1510) and starts the call with IP telephone 102 (step S1705).

Next, in FIG. 18, when receiving the call from IP telephone 101, IP telephone 102 performs a predetermined process to receive the call from IP telephone 101 (step S1801, refer to above-described steps S1507 to S1510) and starts the call with IP telephone 101 (step S1802).

After the call is established, the user of PC 1402 manually inputs the telephone number of IP telephone 101 on the browser and activates ENUM client section 504 (step S1901). PC 1402 then determines whether or not browser 502 of PC 1401 receives an HTML file of still image data transmitted from Web server 104B (step S1902).

When confirming that browser 502 of PC 1401 receives the HTML file of the still image data transmitted from Web server 104B (step S1902: Yes), PC 1402 inquires the URL of Web server 103B to which IP telephone 101 is connected. To inquire the URL, PC 1402 activates ENUM client section 504, responding to the user input of the telephone number of IP telephone 101; transmits to ENUM server 105 the message "IP telephone 101 NAPTR query" having the telephone number "0310000000" of IP telephone 101; and acquires the NAPTR records of IP telephone 101 (step S1903, refer to above-described steps S1515 and S1516).

When acquiring the NAPTR records from ENUM server 105, PC 1402 determines whether or not the NAPTR records include the Web server 103B URL (step S1904). When confirming that the Web server 103B URL is included (step S1904: Yes), PC 1402 proceeds to step S1905.

PC 1402 then extracts the Web server 103B URL "http://www.tokyo1.sip.com/user81310000000.html" included in the NAPTR records and accesses Web server 103B based on the URL (step S1905). At this stage, PC 1402 is ready to receive from Web server 103B an HTML file of still image data (step S1906).

When confirming in step S1902 that browser 502 of PC 1401 receives no HTML file of still image data transmitted from Web server 104B (step S1902: No), PC 1402 aborts and terminates the process. When confirming in step S1904 that no Web server 103B URL is included (step S1904: No), PC 1402 aborts and terminates the process.

PC 1402 is then ready to receive from Web server 103B an HTML file of still image data captured by camera 103A. Display 501 of PC 1401 sequentially displays still images captured by network camera 104; Display 501 of PC 1402 sequentially displays still images captured by network camera 103. The users of IP telephones 101 and 102 are able to enjoy visual communication, that is, to talk while looking at each other's partial motion image displayed on display 501 of PC 1401 and 1402.

As discussed above, IP telephone system 1400 according to the third embodiment offers procedures where IP telephone 101 acquires from ENUM server 105 the NAPTR records of IP telephone 102; IP telephone 101 acquires from DNS server 901 the IP address of IP telephone 102, based on the URI included in the NAPTR records; IP telephones 101 establishes a call with IP telephone 102; PC 1401 then acquires the Web server 104B URL from ENUM server 105; and PC 1401 starts communication of the still image data captured by network camera 104.

Therefore, the user is able to talk while looking at the other user's still image displayed on the PC browser even when the IP telephone has no display. Furthermore, IP telephone system 1400 to which PC's 1401 and 1402 are connected requires no additional hardware for encoding and decoding motion image. IP telephone 101 (102) also requires no extra software for encoding and decoding motion image, achieving inexpensive visual communication.

The above-described third embodiment explains a case where IP telephone 101 places a call to IP telephone 102. The same sequences and flow apply when IP telephone 102 places a call to IP telephone 101. In the third embodiment, the telephone number of IP telephone 102 is selected from the telephone book on PC 1401 and is communicated from PC 1401 to IP telephone 101. Furthermore, when PC 1401 access the Web server 104B URL corresponding to IP telephone 102, saving the Web server 104B URL in the telephone book can simplify procedures above.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Application No. 2004-319898 filed on Nov. 2, 2004, entire content of which is expressly incorporated by reference herein.

What is claimed is:

1. An IP telephone system comprising:
   calling and called IP telephone apparatuses;
   a network camera comprising a camera and a Web server, the camera periodically capturing still image data of a user of the called IP telephone apparatus, the Web server storing the captured still image data in association with a predetermined URL (Uniform Resource Locator), and periodically updating the captured still image data; and
   an ENUM (Telephone Number Mapping) server that stores a NAPTR (Naming Authority Pointer) resource record, the NAPTR resource record including a URI (Uniform Resource Identifier) corresponding to an ENUM domain name, the URI being associated with the predetermined URL of the Web server,
   the calling IP telephone apparatus comprising:
      a key pad configured to input a telephone number of the called IP telephone apparatus;
      a display configured to display data; and
      a controller configured to:
         establish a connection for voice communication with the called IP telephone apparatus based on the input telephone number;
         generate an ENUM domain name based on the input telephone number of the called IP telephone apparatus;
         transmit, to the ENUM server, a request for transmitting, to the calling IP telephone apparatus, the NAPTR resource record corresponding to the generated ENUM domain name, after establishing the connection for voice communication;
         receive, from the ENUM server, the corresponding NAPTR resource record, in response to the transmitted request;
         access the Web server, based on the predetermined URL associated with the URI included in the received NAPTR resource record, after establishing the connection for voice communication;
         periodically receive, from the Web server, the periodically updated still image data in association with the predetermined URL, after the connection for voice communication is established; and
         control the display to periodically display the periodically updated still image data of the user of the called IP telephone apparatus, after the connection for voice communication is established.

2. The IP telephone system according to claim 1, the ENUM server comprising:
   a memory configured to store the NAPTR resource record;
   a controller configured to receive, from the calling IP telephone apparatus, an ENUM domain name and a request for transmitting, to the calling IP telephone apparatus, the NAPTR resource record corresponding to the received ENUM domain name,
   the controller being further configured to transmit, to the calling IP telephone apparatus, the corresponding NAPTR resource record.

3. The IP telephone system according to claim 1, wherein the controller of the calling IP telephone apparatus determines, upon receiving the NAPTR resource record after the connection for voice communication is established, whether or not the received NAPTR resource record includes the URI associated with the predetermined URL of the Web server,
   when it is determined that the received NAPTR resource record includes the URI associated with the predetermined URL of the Web server, the controller accesses the Web server based on the predetermined URL, after the connection for voice communication is established.

4. The IP telephone system according to claim 1, further comprising an other network camera, the other network camera comprising a camera and a Web server, the camera periodically capturing still image data of a user of the calling IP telephone apparatus, the Web server storing the captured still image data in association with a URL, and periodically updating the captured still image data,
   wherein the ENUM server further stores an NAPTR resource record including an other URI corresponding to an ENUM domain name, the other URI being associated with the URL of the Web server included in the other network camera, wherein, the called IP telephone apparatus comprises a display and a controller, the controller configured to:

generate an ENUM domain name based on a telephone number of the calling IP telephone apparatus, after the connection for voice communication between the calling IP telephone apparatus and the called IP telephone apparatus is established;

transmit, to the ENUM server, a request for transmitting, to the called IP telephone apparatus, the NAPTR resource record corresponding to the generated ENUM domain name, after the connection for voice communication between the calling IP telephone apparatus and the called IP telephone apparatus is established;

receive, from the ENUM server, the corresponding NAPTR resource record, in response to the request transmitted from the controller of the called IP telephone apparatus to the ENUM server;

access the Web server of the other network camera, based on the URL associated with the other URI included in the received NAPTR resource record;

periodically receive, from the Web server of the other network camera, the periodically updated still image data in association with the other URL, after the connection for voice communication is established; and control the display to periodically display the periodically updated still image data of the user of the calling IP telephone apparatus, after the connection for voice communication is established.

5. An IP telephone system comprising:

calling and called IP telephone apparatuses, the calling IP telephone apparatus configured to perform voice communication with the called IP telephone apparatus;

a terminal apparatus connected to the calling IP telephone apparatus;

a network camera connected to the terminal apparatus, the network camera comprising a camera and a Web server, the camera periodically capturing still image data of a user of the called IP telephone apparatus, the Web server storing the captured still image data in association with a predetermined URL (Uniform Resource Locator), and periodically updating the captured still image data; and an ENUM (Telephone Number Mapping) server storing a NAPTR (Naming Authority Pointer) resource record, the NAPTR resource record including a URI (Uniform Resource Identifier) corresponding to an ENUM domain name, the URI being associated with the predetermined URL of the Web server, the terminal apparatus comprising:

an input device configured to input a telephone number of the called IP telephone apparatus;

a display configured to display data; and a controller configured to:

transmit, to the calling IP telephone apparatus, the input telephone number of the called IP telephone apparatus and instruct the calling IP telephone apparatus to establish a connection for voice communication with the called IP telephone apparatus;

generate an ENUM domain name based on the input telephone number of the called IP telephone apparatus;

transmit, to the ENUM server, a request for transmitting, to the terminal apparatus, the NAPTR resource record corresponding to the generated ENUM domain name, after the calling IP telephone apparatus establishes the connection for voice communication with the called IP telephone apparatus;

receive, from the ENUM server, the corresponding NAPTR resource record, in response to the transmitted request;

access the Web server, based on the predetermined URL associated with the URI included in the received NAPTR resource record, after the calling IP telephone apparatus establishes the connection for voice communication with the called IP telephone apparatus;

periodically receive, from the Web server, the periodically updated still image data in association with the predetermined URL, after the connection for voice communication is established; and control the display to periodically display the periodically updated still image data of the user of the called IP telephone apparatus, after the connection for voice communication is established, and the calling IP telephone apparatus establishing the connection for voice communication with the called IP telephone apparatus, in response to the instruction from the controller of the terminal apparatus.

6. The IP telephone system according to claim 5, wherein the terminal apparatus includes a memory that stores information of the calling IP telephone apparatus, and the controller transmits, to the calling IP telephone apparatus, the input telephone number of the called IP telephone apparatus, based on the information stored in the memory.

7. The IP telephone system according to claim 5, wherein the display displays a telephone book, and the input device selects the telephone number of the called IP telephone apparatus from the telephone book displayed in the display.

8. A method for a communication using a calling IP telephone apparatus, a network camera and an ENUM (Telephone Number Mapping) server, the network camera comprising a camera and a Web server, the camera periodically capturing still image data of a user of a called IP telephone apparatus, the Web server storing the captured still image data in association with a predetermined URL (Uniform Resource Locator) and periodically updating the captured still image data, the ENUM server storing a NAPTR (Naming Authority Pointer) resource record, the NAPTR resource record including a URI (Uniform Resource Identifier) corresponding to an ENUM domain name, the URI being associated with the predetermined URL of the Web server, the method comprising:

inputting, at the IP telephone apparatus, a telephone number of the called IP telephone apparatus;

establishing a connection for voice communication between the calling IP telephone apparatus and the called IP telephone apparatus based on the input telephone number of the called IP telephone apparatus;

generating an ENUM domain name based on the input telephone number of the called IP telephone apparatus;

transmitting, to the ENUM server, a request for transmitting, to the calling IP telephone apparatus, the NAPTR resource record corresponding to the generated ENUM domain name, after the connection for voice communication between the calling IP telephone apparatus and the called IP telephone apparatus is established;

receiving, from the ENUM server, the corresponding NAPTR resource record, in response to the transmitted request;

determining the predetermined URL associated with the URI included in the received NAPTR resource record;

accessing the Web server, based on the predetermined URL, after the connection for voice communication is established;

periodically receiving, from the Web server, the periodically updated still image data in association with the predetermined URL, after the connection for voice communication is established; and periodically displaying the periodically updated still image data of the user of the called IP telephone apparatus, after the connection for voice communication is established.

9. The method for communication according to claim 8, further comprising:

determining, at the calling IP telephone apparatus, upon receiving the NAPTR resource record after the connection for voice communication is established, whether or not the received NAPTR resource record includes the URI associated with the predetermined URL of the Web server, wherein, when it is determined that the received NAPTR resource record includes the URI associated with the predetermined URL of the Web server, the Web server accesses the Web server based on the predetermined URL, after the connection for voice communication is established.

10. The method for communication according to claim 8, further comprising using an other network camera, the other network camera comprising a camera and a Web server, the camera periodically capturing still image data of a user of the calling IP telephone apparatus, the Web server storing the captured still image data in association with a URL, and periodically updating the captured still image data, wherein the ENUM server further stores an NAPTR resource record including an other URI corresponding to an ENUM domain name, the other URI being associated with the URL of the Web server included in the other network camera, the method further comprising:

generating, by the called IP telephone apparatus, an ENUM domain name based on a telephone number of the calling IP telephone apparatus, after the connection for voice communication between the calling IP telephone apparatus and the called IP telephone apparatus is established;

transmitting, from the called IP telephone apparatus to the ENUM server, a request for transmitting, to the called IP telephone apparatus, the NAPTR resource record corresponding to the generated ENUM domain name, after the connection for voice communication between the calling IP telephone apparatus and the called IP telephone apparatus is established;

receiving, at the called IP telephone apparatus, from the ENUM server, the corresponding NAPTR resource record, in response to the request transmitted from the controller of the called IP telephone apparatus to the ENUM server;

accessing, by the called IP telephone apparatus, the Web server of the other network camera, based on the URL associated with the other URI included in the received NAPTR resource record;

periodically receiving, at the called IP telephone apparatus, from the Web server of the other network camera, the periodically updated still image data in association with the other URL, after the connection for voice communication is established; and controlling a display at the called IP telephone apparatus to periodically display the periodically updated still image data of the user of the calling IP telephone apparatus, after the connection for voice communication is established.

11. A method for communication using a terminal apparatus, a calling IP telephone apparatus, a network camera and to an ENUM (Telephone Number Mapping) server, the network camera comprising a camera and a Web server, the camera periodically capturing still image data of a user of called IP telephone apparatus, the Web server storing the captured still image data in association with a predetermined URL (Uniform Resource Locator) and periodically updating the captured still image data, the ENUM server storing a NAPTR (Naming Authority Pointer) resource record, the NAPTR resource record including a plurality of URIs (Uniform Resource Identifiers) corresponding to an ENUM domain name, the plurality of URIs including a first URI and a second URI, the first URI being associated with an IP address of the called IP telephone apparatus, the second URI being associated with the predetermined URL of the Web server, the calling IP telephone apparatus being connected to the ENUM server, the method comprising:

inputting, at the terminal apparatus, a telephone number of the called IP telephone apparatus;

transmitting the input telephone number of the called IP telephone apparatus to the calling IP telephone apparatus;

generating, at the calling IP telephone apparatus, an ENUM domain name based on the telephone number of the called IP telephone apparatus transmitted from the terminal apparatus;

transmitting, from the calling IP telephone apparatus to the ENUM server, a request for transmitting, to the calling IP telephone apparatus, the NAPTR resource record corresponding to the generated ENUM domain name;

receiving, from the ENUM server at the calling IP telephone apparatus, the corresponding NAPTR resource record;

accessing, at the calling IP telephone apparatus, the called IP telephone apparatus to establish a connection for a voice communication between the calling IP telephone apparatus and the called IP telephone apparatus via the Internet, based on the IP address associated with the first URI included in the received NAPTR resource record;

generating, at the terminal apparatus, the ENUM domain name based on the input telephone number of the called IP telephone apparatus;

transmitting, from the terminal apparatus to the ENUM server, a request for transmitting, to the terminal apparatus, the NAPTR resource record corresponding to the generated ENUM domain name, after the connection for voice communication between the calling IP telephone apparatus and the called IP telephone apparatus is established;

receiving, at the terminal apparatus, from the ENUM server at the terminal apparatus, the corresponding NAPTR resource record, in response to the request sent to the ENUM server from the terminal apparatus;

accessing, at the terminal apparatus, the Web server, based on the predetermined URL associated with the second URI included in the NAPTR resource record received in response to the request sent to the ENUM server from the terminal apparatus, after the connection for voice communication is established;

periodically receiving, at the terminal apparatus from the Web server, the periodically updated still image data in association with the predetermined URL, after the connection for voice communication between the calling IP apparatus and the called IP telephone apparatus; and periodically displaying, at the terminal apparatus, the periodically updated still image data of the user of the called IP telephone apparatus, after the connection for voice communication between the calling IP telephone apparatus and the called IP telephone apparatus.

12. A calling IP telephone apparatus connected to a network camera comprising a camera and a Web server, the camera periodically capturing still image data of a user of the called IP telephone apparatus, the Web server storing the captured still image data in association with a predetermined URL (Uniform Resource Locator), and periodically updating the captured still image data; and connected to an ENUM (Telephone Number Mapping) server that stores a NAPTR (Naming Authority Pointer) resource record, the NAPTR resource record including a URI (Uniform Resource Identifier) corresponding to an ENUM domain name, the URI being associated with the predetermined URL of the Web server, the calling IP telephone apparatus comprising:

a key pad configured to input a telephone number of the called IP telephone apparatus;

a display configured to display data; and a controller configured to:

establish a connection for voice communication with the called IP telephone apparatus based on the input telephone number;

generate an ENUM domain name based on the input telephone number of the called IP telephone apparatus;

transmit, to the ENUM server, a request for transmitting, to the calling IP telephone apparatus, the NAPTR resource record corresponding to the generated ENUM domain name, after establishing the connection for voice communication;

receive, from the ENUM server, the corresponding NAPTR resource record, in response to the transmitted request;

access the Web server, based on the predetermined URL associated with the URI included in the received NAPTR resource record, after establishing the connection for voice communication;

periodically receive, from the Web server, the periodically updated still image data in association with the predetermined URL, after the connection for voice communication is established; and control the display to periodically display the periodically updated still image data of the user of the called IP telephone apparatus, after the connection for voice communication is established.

* * * * *